US009661266B2

(12) United States Patent
Inoue et al.

(10) Patent No.: US 9,661,266 B2
(45) Date of Patent: May 23, 2017

(54) INFORMATION PROCESSING APPARATUS, RECORDING MEDIUM AND INFORMATION PROCESSING METHOD

(71) Applicants: Takeru Inoue, Kanagawa (JP); Tatsuyuki Oikawa, Tokyo (JP)

(72) Inventors: Takeru Inoue, Kanagawa (JP); Tatsuyuki Oikawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/245,848

(22) Filed: Aug. 24, 2016

(65) Prior Publication Data

US 2017/0064252 A1 Mar. 2, 2017

(30) Foreign Application Priority Data

Aug. 26, 2015 (JP) .................................. 2015-167212

(51) Int. Cl.
*H04N 7/14* (2006.01)
*H04L 29/06* (2006.01)
(Continued)

(52) U.S. Cl.
CPC .......... *H04N 7/147* (2013.01); *H04L 65/403* (2013.01); *H04N 7/15* (2013.01); *G06F 3/0485* (2013.01); *G06F 3/04817* (2013.01); *H04L 67/10* (2013.01)

(58) Field of Classification Search
CPC combination set(s) only.
See application file for complete search history.

(56) References Cited

U.S. PATENT DOCUMENTS 7,391,432 B2 6/2008 Terada
9,185,344 B2 11/2015 Inoue
(Continued)

FOREIGN PATENT DOCUMENTS

| JP | 2002-238040 | 8/2002 |
| JP | 2013-157995 | 8/2013 |
| JP | 2015-201824 | 11/2015 |

OTHER PUBLICATIONS

Niimi, "Speech Recognition", Kyoritsu Publishing, Co., 1979, pp. 68-72 (with English Translation).
(Continued)

*Primary Examiner* — Joseph J Nguyen
(74) *Attorney, Agent, or Firm* — Oblon, McClelland, Maier & Neustadt, L.L.P.

(57) ABSTRACT

An information processing apparatus for communication with an information processing device via a network disclosed. The information processing apparatus includes a display controlling unit configured to perform display control on a first screen that displays image data transmitted from the information processing device or on a second screen that displays information about the information processing device; and a first instruction receiving unit configured to receive a switching instruction to switch the first screen to the second screen. The display controlling unit performs the display control in a case where the first instruction receiving unit receives the switching instruction, such that auxiliary information about communication with the information processing device, the auxiliary information being displayed on the first screen, is not displayed on the second screen.

7 Claims, 22 Drawing Sheets

(51) Int. Cl.
    *H04N 7/15*     (2006.01)
    *G06F 3/0481*     (2013.01)
    *H04L 29/08*     (2006.01)
    *G06F 3/0485*     (2013.01)

(56) References Cited

U.S. PATENT DOCUMENTS

| | | |
|---|---|---|
| 9,307,197 B2 | 4/2016 | Kato et al. |
| 9,369,501 B2 | 6/2016 | Inoue et al. |
| 2011/0060835 A1* | 3/2011 | Dorso ............... H04L 65/1069 709/227 |
| 2012/0206558 A1* | 8/2012 | Setton ................ H04N 7/147 348/14.03 |
| 2014/0009475 A1* | 1/2014 | Setton ................ G06T 13/80 345/473 |
| 2014/0137193 A1 | 5/2014 | Inoue |
| 2014/0282221 A1* | 9/2014 | Weber ................ G06F 3/0488 715/783 |
| 2015/0030316 A1 | 1/2015 | Oikawa |
| 2015/0046581 A1 | 2/2015 | Inoue |
| 2015/0149909 A1 | 5/2015 | Nakamura et al. |
| 2015/0208015 A1* | 7/2015 | Takahashi ........... H04N 7/181 348/159 |
| 2015/0222670 A1 | 8/2015 | Inoue et al. |
| 2015/0271214 A1 | 9/2015 | Oikawa |
| 2015/0341442 A1 | 11/2015 | Inoue |
| 2016/0154554 A1* | 6/2016 | Fang .................. G06F 3/0481 715/777 |
| 2016/0364128 A1* | 12/2016 | Nakagawa ......... G06F 3/04847 |

OTHER PUBLICATIONS

U.S. Appl. No. 15/200,606, filed Jul. 1, 2016.
U.S. Appl. No. 15/194,837, filed Jun. 28, 2016.

\* cited by examiner

INFORMATION PROCESSING APPARATUS, RECORDING MEDIUM AND INFORMATION PROCESSING METHOD

CROSS-REFERENCE TO RELATED APPLICATIONS

The present application claims priority under 35 U.S.C. §119 to Japanese Patent Application No. 2015-167212, filed Aug. 26, 2015, the contents of which are incorporated herein by reference in their entirety.

BACKGROUND OF THE INVENTION

1. Field of the Invention

The present invention relates to an information processing apparatus, a recording medium, and an information processing method.

2. Description of the Related Art

There are transmission systems that hold a video conference and the like among a plurality of terminal devices via a network such as the Internet. In such transmission systems, image data and voice sound data collected by one transmission terminal during the video conference are transmitted to another transmission terminal. The other transmission terminal receives the image data and the voice sound data, displays an image on a display screen or the like, and outputs voice sound from a loudspeaker, such that the video conference is held among these transmission terminals.

In such transmission systems, transmission terminals that participate in a video conference are not limited to two devices. The video conference among multiple locations may be realized by all of the transmission terminals that participate in the video conference. Accordingly, image data and voice sound data may be transmitted to one transmission terminal from all of other locations (or may be limited due to bandwidth in some cases). Each transmission terminal divides a screen rendered on a display screen panel of the transmission terminal into fields that correspond to the number of the transmission terminals that participate in the video conference and displays images of participants in each of the divided fields, the images being transmitted from each of the transmission terminals (hereafter referred to as a "full screen display mode").

Further, when the number of locations is increased, users may wish to determine which locations are participating in the conference. In view of this, there are transmission terminals that have, other than the full screen display mode, a screen mode to display information indicative of transmission terminals that are participating in the video conference (see Patent Document 1, for example). Such a display mode during the video conference is referred to as an "information display mode."

In addition, there is a need to display information about transmission terminals that are participating in the video conference in the full screen display mode, so that an auxiliary field for displaying information about the transmission terminals may be set in the full screen display mode.

FIG. 22 is a diagram depicting an auxiliary field 173 displayed in the full screen display mode. When the auxiliary field 173 is displayed, users may confirm, while viewing images, information about transmission terminals that are participating in the video conference.

RELATED ART DOCUMENTS

[Patent Document 1] Japanese Unexamined Patent Application Publication No. 2013-157995
[Non-patent Document 1] Niimi, *Speech recognition*, 1979, pp. 68 to 72, Kyoritsu Publishing Co.

SUMMARY OF THE INVENTION

In an embodiment, an information processing apparatus for communication with an information processing device via a network is provided. The information processing apparatus includes a display controlling unit configured to perform display control on a first screen that displays image data transmitted from the information processing device or on a second screen that displays information about the information processing device; and a first instruction receiving unit configured to receive a switching instruction to switch the first screen to the second screen. The display controlling unit performs the display control in a case where the first instruction receiving unit receives the switching instruction, such that auxiliary information about communication with the information processing device, the auxiliary information being displayed on the first screen, is not displayed on the second screen.

BRIEF DESCRIPTION OF THE DRAWINGS

Other objects and further features of embodiments will become apparent from the following detailed description when read in conjunction with the accompanying drawings, in which.

DESCRIPTION OF THE EMBODIMENTS

In the following, embodiments of the present invention will be described with reference to accompanying drawings.

It is an object of at least one embodiment of the present invention to provide an information processing apparatus capable of obtaining a preferable screen transition.

<<Overall Structure of Embodiment>>

Figure 1:
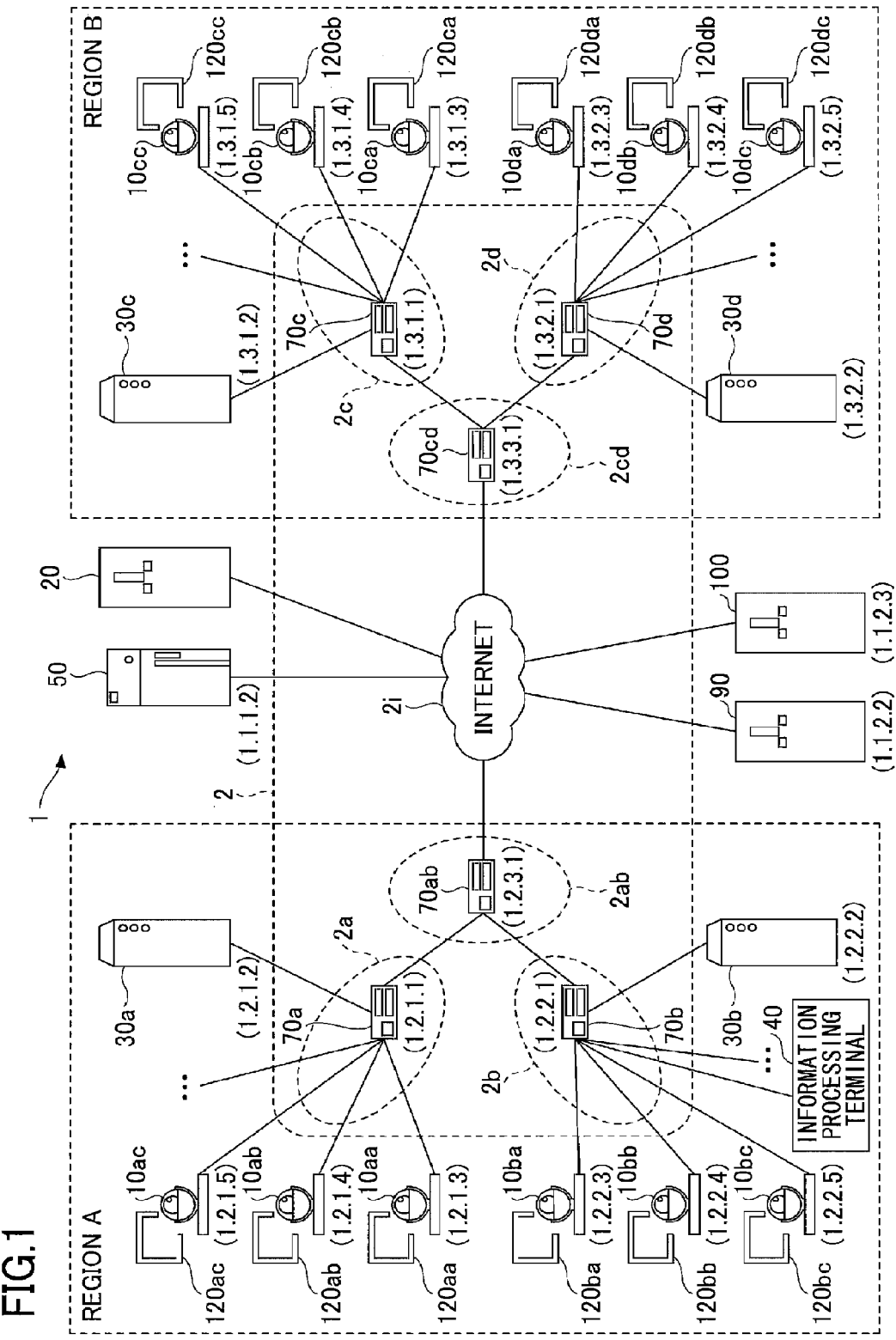
FIG. 1 is a schematic diagram of a transmission system 1 according to an embodiment of the present invention.
Figure 2:
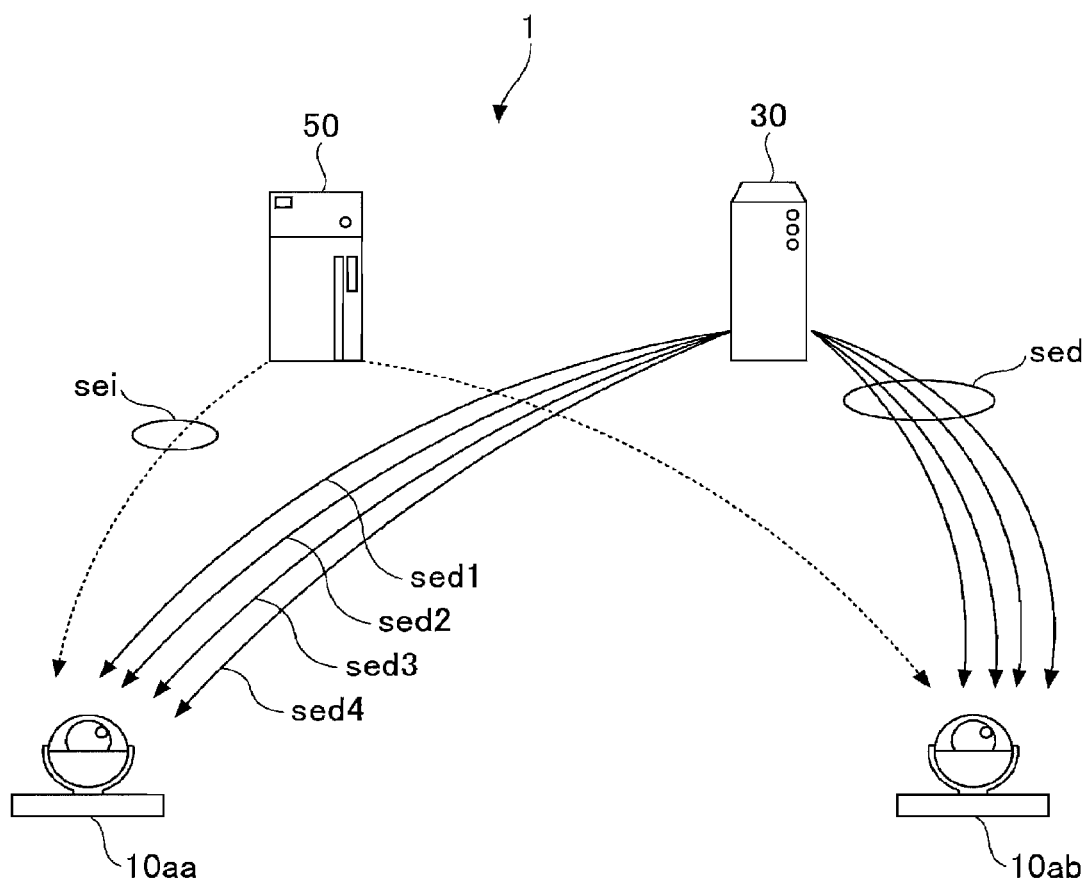
FIG. 2 is a conceptual diagram depicting transmission and reception states of image data, voice sound data, and various types of management information in a transmission system according to an embodiment of the present invention.

FIG. 1 is a schematic diagram of the transmission system 1 according to an embodiment of the present invention. FIG. 2 is a conceptual diagram depicting transmission and reception states of image data, voice sound data, and various types of management information in the transmission system 1 according to the embodiment of the present invention. Further, the transmission system 1 includes a data providing system that transmits content data from one transmission terminal to a plurality of transmission terminals in one direction via a transmission management device 50. The transmission system 1 also includes a communication system that communicates information, feelings, or the like mutually among a plurality of transmission terminals via the transmission management device 50. The communication system may be a system for communicating information, feelings, or the like mutually among a plurality of communication terminals (corresponding to the "transmission terminals") via a communication management device (corresponding to the "transmission management device"). Examples of such a communication system include a video conference system and a video phone system.

In the embodiment, the transmission system 1, the transmission management device 50, and a transmission terminal 10 are described on the assumption that the video conference system is an example of the communication system, a video conference management device is an example of the communication management device, and a video conference terminal is an example of the communication terminal. In other words, the transmission terminal 10 and the transmission management device 50 of the present invention may be applied not only to the video conference system but also to the communication system or a data transmission system.

As illustrated in FIG. 1, the transmission system 1 includes a plurality of transmission terminals 10aa, 10ab . . . , display screen panels 120aa, 120ab . . . for the respective transmission terminals 10aa, 10ab . . . , a UI providing device 20, a relay device 30, an information processing terminal 40, the transmission management device 50, and a program providing device 90. The transmission terminals 10aa, 10ab . . . perform communication via transmission and reception of image data and voice sound data as content data, for example.

The UI providing device 20 is a device that transmits layout information for mainly displaying the number of locations to the transmission terminals 10aa, 10ab . . . , as will be described below. The transmission management device 50 or the relay device 30 may serve as the UI providing device 20, for example.

Further, the information processing terminal 40 is a device in which functions of the transmission terminal 10 are implemented by software. Specifically, examples of the information processing terminal 40 include a Personal Computer (PC), a tablet terminal, a smartphone, a mobile phone, a Personal Digital Assistant (PDA), and a terminal for electronic books.

In the following description, a given one of the plurality of transmission terminals 10aa, 10ab . . . may be described as a "transmission terminal 10" and a given one of the plurality of display screen panels 120aa, 120ab . . . may be described as a "display screen panel 120." Further, a transmission terminal 10 that sends a request for starting a video conference as a requestor may be described as a "requester terminal" and a transmission terminal 10 to which the request is sent as a destination may be described as a "destination terminal."

Further, the transmission terminal 10 that is participating in a video conference or a place where the transmission terminal 10 is disposed may be referred to as a "location." Although the number of locations is the same as the number of transmission terminals 10 that are participating in the video conference, a plurality of transmission terminals 10 may be present in a space regarded as a single space (such as a single conference room).

As illustrated in FIG. 2, in the transmission system 1, a management information session "sei" for transmitting and receiving various types of management information is established between a requestor terminal 10aa and a destination terminal 10ab (reference numerals are example) via the transmission management device 50.

Between the transmission terminals 10 for which the management information session "sei" is established, four sessions for transmitting and receiving four types of data including high resolution image data "sed 1", intermediate resolution image data "sed 2," low resolution image data "sed 3," and voice sound data "sed 4" are established via the relay device 30. These four sessions are collectively represented as an "image and voice sound data session 'sed'" in the embodiment.

In FIG. 1, the relay device 30 relays content data among a plurality of transmission terminals 10. The transmission management device 50 manages log-in authentication from the transmission terminal 10, a transmission state of the terminal 10, a destination list, a transmission state of the relay device 30, and the like in an integrated manner. In addition, an image represented with image data may be a movie, a still image, or both the movie and the still image.

A plurality of routers (70a, 70b, 70c, 70d, 70ab, and 70cd) select an optimum path for image data and voice sound data. In the following description, a given router among the routers 70a, 70b, 70c, 70d, 70ab, and 70cd may be described as a "router 70."

The program providing device 90 includes a Hard Disk (HD) 204 described below that stores a transmission terminal controlling program 1000a for causing the transmission terminal 10 to implement various functions. The program providing device can transmit the transmission terminal controlling program 1000a to the terminal 10.

Further, the HD 204 of the program providing device 90 also stores a relay device program for causing the relay device 30 to implement various functions. The program providing device 90 can transmit the relay device program to the relay device 30.

Further, the HD 204 of the program providing device 90 also stores a transmission management program for causing the transmission management device 50 to implement various functions. The program providing device 90 can transmit the transmission management program to the transmission management device 50.

Further, the HD 204 of the program providing device 90 also stores a UI providing device program for causing the UI providing device 20 to implement various functions. The program providing device 90 can transmit the UI providing device program to the UI providing device 20.

Further, the HD 204 of the program providing device 90 also stores an information processing terminal program for causing the information processing terminal 40 to implement various functions. The program providing device 90 can transmit the information processing terminal program to the information processing terminal 40.

The transmission terminal 10aa, 10ab, and the router 70a are communicatively connected via a LAN 2a. Transmission terminals 10ba, 10bb, and the router 70b are communicatively connected via a LAN 2b.

The LAN 2a and the LAN 2b are communicatively connected via a dedicated line 2ab in which the router 70ab is included and the LAN 2a and the LAN 2b are constructed within a predetermined region A. For example, the region A is Japan and the LAN 2a is constructed within an office in Tokyo, while the LAN 2b is constructed within an office in Osaka.

Transmission terminals 10ca, 10cb, and the router 70c are communicatively connected via a LAN 2c. Transmission terminals 10da, 10db, 10dc . . . and the router 70d are communicatively connected via a LAN 2d.

The LAN 2c and the LAN 2d are communicatively connected via a dedicated line 2cd in which the router 70cd is included and the LAN 2c and the LAN 2d are constructed within a predetermined region B. For example, the region B is the United States of America and the LAN 2c is constructed within an office in New York, while the LAN 2d is constructed within an office in Washington D.C. The region A and the region B are communicatively connected via the Internet 2i from the routers 70ab, 70cd.

Further, the relay device 30, the transmission management device 50, the UI providing device 20, the information processing terminal 40, and the program providing device 90 are communicatively connected to each transmission terminal 10 via the Internet 2i. The relay device the transmission management device 50, the UI providing device 20, the information processing terminal 40, and the program providing device 90 may be disposed in the region A or the region B or may be disposed in another region.

In the embodiment, the LAN 2a, the LAN 2b, the dedicated line 2ab, the Internet 2i, the dedicated line 2cd, the LAN 2c, and the LAN 2d constitute a transmission network 2. The transmission network 2 may include a part where wireless transmission such as Wireless Fidelity (WiFi) or Bluetooth (registered trademark) is performed in addition to wired communication.

In FIG. 1, a set of four numbers described beneath each transmission terminal 10, each relay device 30, the transmission management device 50, each router 70, the UI providing device 20, the information processing terminal 40, and the program providing device 90 indicates an IP address in general IPv4 in a simplified manner. For example, the IP address of the transmission terminal 10aa is "1.2.1.3." While IPv6 may be used instead of IPv4, IPv4 is used in order to simplify descriptions.

Each transmission terminal 10 may be used not only for a video conference among a plurality of offices or a video conference between different rooms in the same office but also for a video conference in the same room or a video conference between an outdoor place and an indoor place or between outdoor places. If each transmission terminal 10 is used outdoors, wireless transmission is performed in a mobile phone communication network or the like.

<<Hardware Configuration of Embodiment>>

Figure 3:
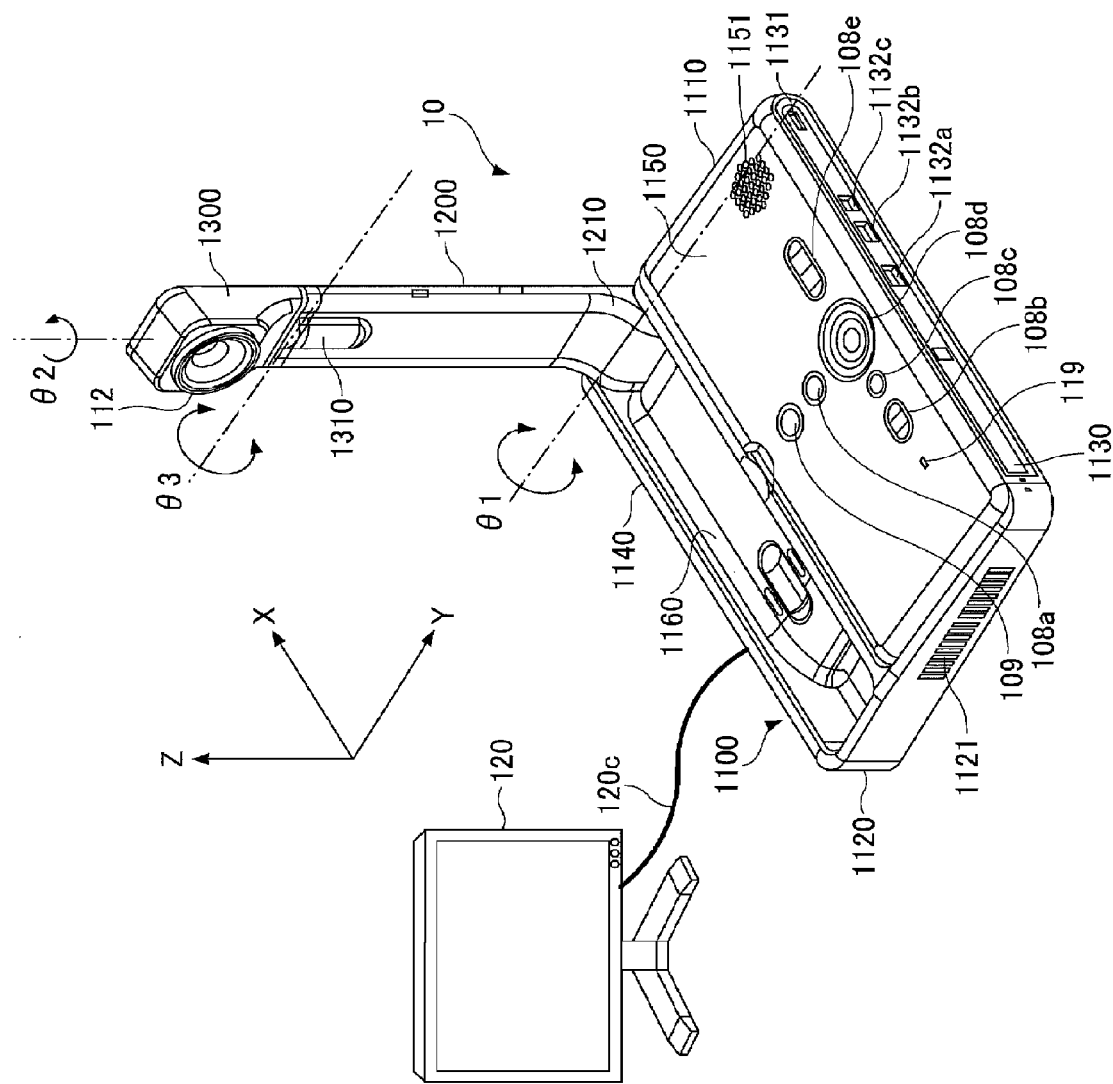
FIG. 3 is an external view of a transmission terminal according to an embodiment of the present invention.

FIG. 3 is an external view of the transmission terminal 10 according to the embodiment of the present invention. In the following, a longitudinal direction of the transmission terminal 10 is described as an X axis direction, a direction orthogonal to the X axis direction within a horizontal plane is described as a Y axis direction, and a direction (vertical direction) orthogonal to the X axis direction and the Y axis direction is described as a Z axis direction.

As illustrated in FIG. 3, the transmission terminal 10 includes a case 1100, an arm 1200, and a camera housing 1300. The case 1100 has a front wall surface 1110 where an air intake surface formed with a plurality of air intake holes is located. The case 1100 also has a rear wall surface 1120 where an air outlet surface 1121 formed with a plurality of air outlet holes is located. In accordance with these surfaces, by driving a cooling fan built in the case 1100, it is possible to take in external air in front of the transmission terminal 10 via the air intake surface and discharge the air backward from the transmission terminal 10 via the air outlet surface 1121. The case 1100 has a right wall surface 1130 where a sound collection hole 1131 is formed and a built-in microphone 114 to be described later is capable of collecting sound such as voice sound, other sound, and noise.

An operation panel 1150 is formed on a right wall surface part of a top surface of the case 1100. On the operation panel 1150, a plurality of operation buttons (108a to 108e), a power supply switch 109, and an alarm lamp to be described later are located. Further, on the operation panel 1150, sound output surface 1151 formed with a plurality of sound output holes for issuing output sound from a built-in loudspeaker 115 to be described later is located. Further, on a left wall surface part of the top surface of the case 1100, a housing section 1160 for housing the arm 1200 and the camera housing 1300 is formed as a concave portion. On the right wall surface 1130 of the case 1100, a plurality of connection ports (1132*a* to 1132*c*) for electrically connecting a cable to an external device connection I/F 118 to be described later are formed. On a left wall surface 1140 of the case 1100, a connection port for electrically connecting a cable 120*c* for the display screen panel 120 to the external device connection I/F 118 is formed.

In the following, any one of the operation buttons (108*a* to 108*e*) is described as an "operation button 108" and any one of the connection ports (1132*a* to 1132*c*) is described as a "connection port 1132."

The arm 1200 is installed on the case 1100 via a torque hinge 1210. The arm 1200 is configured rotatably in upper and lower directions within a range of 135 degrees as a tilt angle θ1 relative to the case 1100. FIG. 3 depicts a case where the tilt angle θ1 is 90 degrees.

The camera housing 1300 has a built-in camera 112 to be described later and can take pictures of a user, a document, a room, and the like. On the camera housing 1300, a torque hinge 1310 is formed. The camera housing 1300 is installed on the arm 1200 via the torque hinge 1310. The camera housing 1300 is configured rotatably in right and left directions within a range of ±180 degrees as a pan angle θ2 and in upper and lower directions within a range of ±45 degrees as a tilt angle θ3 relative to the arm 1200 based on a state depicted in FIG. 3 as zero degrees.

The external view in FIG. 3 is only for description and an appearance of the transmission terminal 10 is not limited to the external view in FIG. 3.

Further, because the UI providing device 20, the relay device 30, the transmission management device 50, the program providing device 90, and a maintenance system 100 have the same appearance as a general-purpose server computer, a description of their appearances is omitted. Because the information processing terminal 40 has the same appearance as a typical PC, a smartphone, a tablet terminal, or the like, a description of its appearance is omitted.

<Hardware Configuration of Transmission Terminal>

Figure 4:
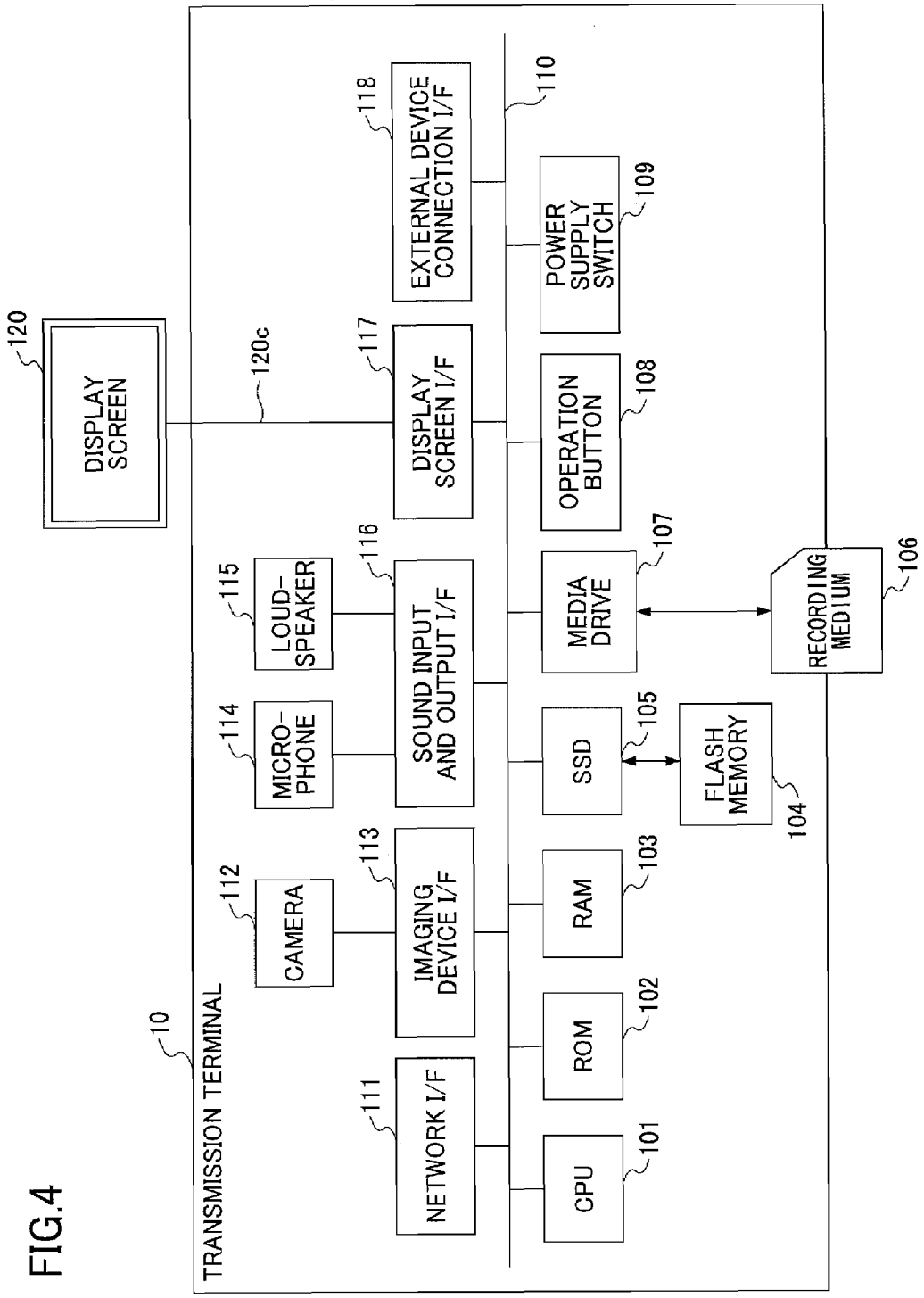
FIG. 4 is a hardware configuration diagram of a transmission terminal according to an embodiment of the present invention.

FIG. 4 is a hardware configuration diagram of the transmission terminal 10 according to the embodiment of the present invention. As illustrated in FIG. 4, the transmission terminal 10 includes a Central Processing Unit (CPU) 101 that controls all operations of the transmission terminal 10 and a Read Only Memory (ROM) 102 that stores a program such as an Initial Program Loader (IPL) used to drive the CPU 101. Further, the transmission terminal 10 also includes a Random Access Memory (RAM) 103 that is used as a work area of the CPU 101 and a flash memory 104 that stores various types of data such as the transmission terminal controlling program 1000*a*, image data, and voice sound data. Further, the transmission terminal 10 also includes a Solid State Drive (SSD) 105 that controls reading or writing of various types of data from or into the flash memory 104 in accordance with control of the CPU 101. Further, the transmission terminal 10 also includes a media drive 107 that controls reading or writing (storing) of data from or into a recording medium 106 such as a flash memory and the operation button 108 that is operated upon selecting a destination of the transmission terminal 10. Further, the transmission terminal 10 also includes the power supply switch 109 for switching between power-on and power-off of the transmission terminal 10 and a network interface (I/F) 111 for transmitting data using the transmission network 2.

Further, the transmission terminal 10 also includes the built-in camera 112 that takes pictures of an object in accordance with control of the CPU 101 in order to obtain image data, an imaging device I/F 113 that controls driving of the camera 112, and the microphone 114 as a built-in sound collecting device for inputting sound. Further, the transmission terminal 10 also includes the built-in loudspeaker 115 for issuing sound and a sound input and output I/F 116 for processing input and output of a sound signal between the microphone 114 and the loudspeaker 115 in accordance with control of the CPU 101. Further, the transmission terminal 10 also includes a display screen I/F 117 for transmitting image data to the external display screen panel 120 in accordance with control of the CPU 101. Further, the transmission terminal 10 also includes an external device connection I/F 118 for connecting various types of external devices and a bus line 110 such as an address bus, a data bus, or the like for electrically connecting each of the above constituent elements.

The display screen panel 120 constitutes a display device configured with liquid crystal or organic electroluminescence (EL) for displaying images of a subject, icons for operation, and the like. The display screen panel 120 is connected to the display screen I/F 117 via the cable 120*c*. The cable 120*c* may be a cable for analogue RGB (VGA) signals or a cable for component video signals. Further, the cable 120*c* may be a cable for High-Definition Multimedia Interface (HDMI) (registered trademark) signals or a cable for Digital Video Interactive (DVI) signals.

The camera 112 includes a lens and a solid-state image sensing device for converting light into an electric charge to digitalize images of a subject. Examples of the solid-state image sensing device include a Complementary Metal Oxide Semiconductor (CMOS) device and a Charge Coupled Device (CCD).

An external device such as an external camera, an external microphone, or an external loudspeaker may be connected to the external device connection I/F 118 via a Universal Serial Bus (USE) cable, for example.

If the external camera is connected to the external device connection I/F 118, the external camera is driven by the CPU 101 preferentially over the built-in camera 112. Further, if the external microphone or the external loudspeaker is connected to the external device connection I/F 118, the external microphone or the external loudspeaker is driven by the CPU 101 preferentially over the built-in microphone 114 or the built-in loudspeaker 115.

In addition, the recording medium 106 is configured to be removably attachable to the transmission terminal 10. Further, the transmission terminal 10 may employ an Electrically Erasable and Programmable ROM (EEPROM) or the like instead of the flash memory 104 as long as the memory is a non-volatile memory in which reading or writing of data is performed in accordance with control of the CPU 101.

Further, the transmission terminal controlling program 1000*a* may be recorded and distributed in a computer-readable recording medium such as the recording medium 106 with a file in an installable format or an executable format. Further; the transmission terminal controlling program 1000*a* may be stored in the ROM 102 instead of the flash memory 104.

The information processing terminal 40 has the same hardware configuration as in the transmission terminal 10, so that a description thereof is omitted. However, the SSD 105 stores an information processing terminal program for controlling the information processing terminal 40.

<<Hardware Configurations of Transmission Management Device, UI Providing Device, Relay Device, and Program Providing Device>>

Figure 5:
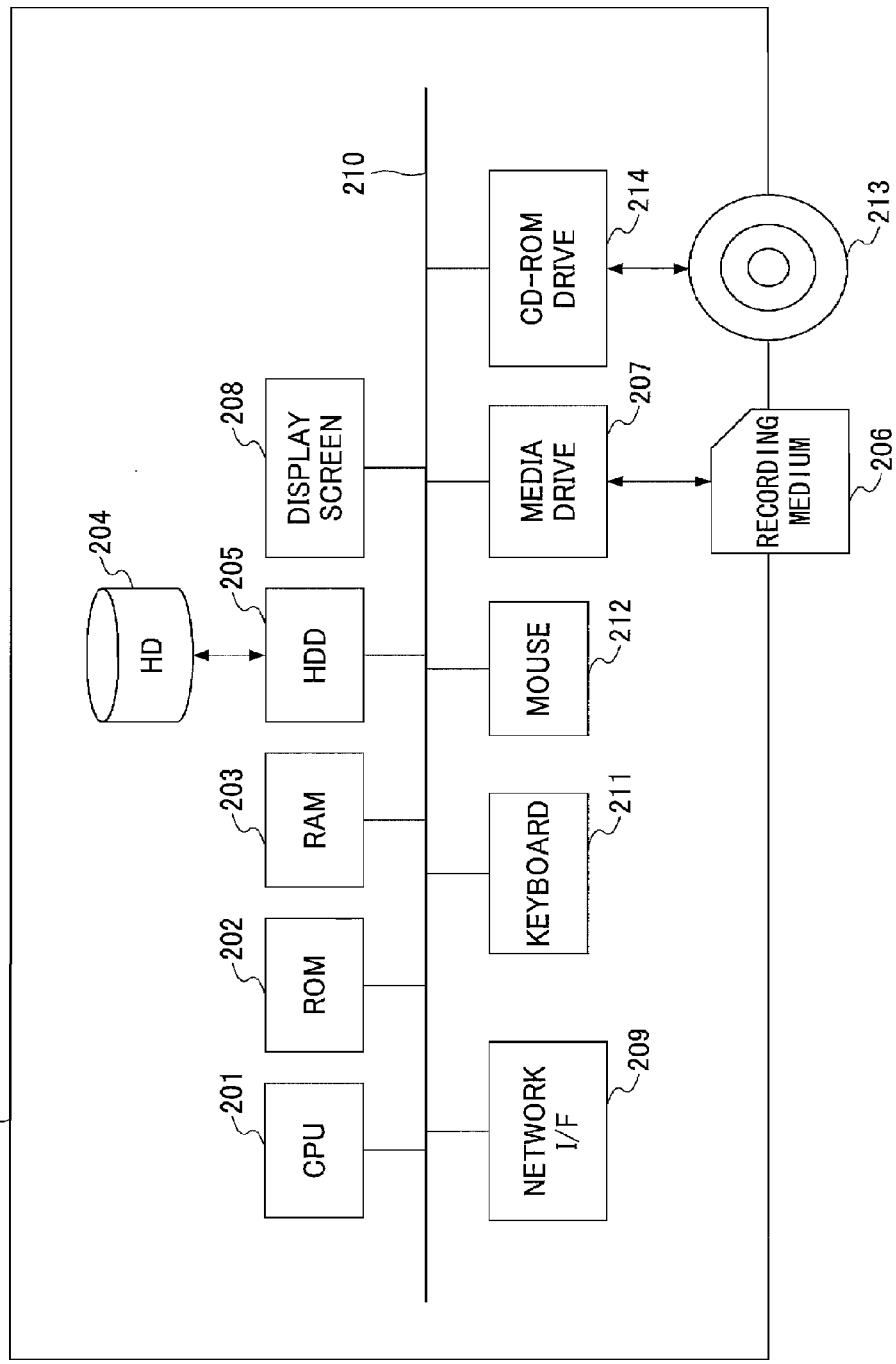
FIG. 5 is a hardware configuration diagram of a transmission management device, a UI providing device, a relay device, or a program providing device according to an embodiment of the present invention.

FIG. 5 is a hardware configuration diagram of the transmission management device 50, the UI providing device 20, the relay device 30, or the program providing device 90 according to the embodiment of the present invention. As illustrated in FIG. 5, the transmission management device 50 includes a CPU 201 that controls all operations of the transmission management device 50, a ROM 202 that stores a program such as IPL used to drive the CPU 201, and a RAM 203 used as a work area of the CPU 201. Further, the transmission management device 50 also includes the HD 204 that stores various types of data such as the transmission management program and a Hard Disk Drive (HDD) 205 that controls reading or writing of various types of data from or into the HD 204 in accordance with control of the CPU 201. Further, the transmission management device 50 also includes a media drive 207 that controls reading or writing (storing) of data from or into a recording medium 206 such as a flash memory and a display screen 208 that displays various types of information such as a cursor, a menu, a window, characters, and an image. Further, the transmission management device 50 also includes a network I/F 209 for transmitting data using the transmission network 2 and a keyboard 211 having a plurality of keys for inputting characters, numerical values, and various types of instructions. Further, the transmission management device 50 also includes a mouse 212 for selecting and executing various types of instructions, selecting an object to be processed, and moving the cursor. Further, the transmission management device 50 also includes a Compact Disc Read Only Memory (CD-ROM) drive 214 that controls reading of various types of data from a CD-ROM 213 as an example of a removable recording medium. Further, the transmission management device 50 also includes a bus line 210 such as an address bus, a data bus, or the like for electrically connecting each of the above constituent elements.

The transmission management program may be recorded and distributed in a computer-readable recording medium such as the recording medium 206 or the CD-ROM 213 with a file in an installable format or an executable format. Further, the transmission management program may be stored in the ROM 202 instead of the HD 204.

The relay device 30 has the same hardware configuration as in the transmission management device 50, so that a description thereof is omitted. However, the HD 204 stores the relay device program for controlling the relay device 30.

In this case, the relay device program may be recorded and distributed in a computer-readable recording medium such as the recording medium 206 or the CD-ROM 213 with a file in an installable format or an executable format. Further, the relay device program may be stored in the ROM 202 instead of the HD 204.

The program providing device 90 has the same hardware configuration as in the transmission management device 50, so that a description thereof is omitted. However, the HD 204 stores a program providing device program for controlling the program providing device 90.

In this case, the program providing device program may be recorded and distributed in a computer-readable recording medium such as the recording medium 206 or the CD-ROM 213 with a file in an installable format or an executable format. Further, the program providing device program may be stored in the ROM 202 instead of the HD 204.

The UI providing device 20 has the same hardware configuration as in the transmission management device 50, so that a description thereof is omitted. However, the HD 204 stores a UI providing device program for controlling the UI providing device 20 and layout information described below.

In this case, the UI providing device program and the layout information may be recorded and distributed in a computer-readable recording medium such as the recording medium 206 or the CD-ROM 213 with a file in an installable format or an executable format. Further, the UI providing device program and the layout information may be stored in the ROM 202 instead of the HD 204.

In addition, a Compact Disc Recordable (CD-R), a Digital Versatile Disk (DVD), a Blu-ray Disk, or the like may be used as the above computer readable recording medium.

<Functional Configuration of Transmission System 1>

Figure 6:
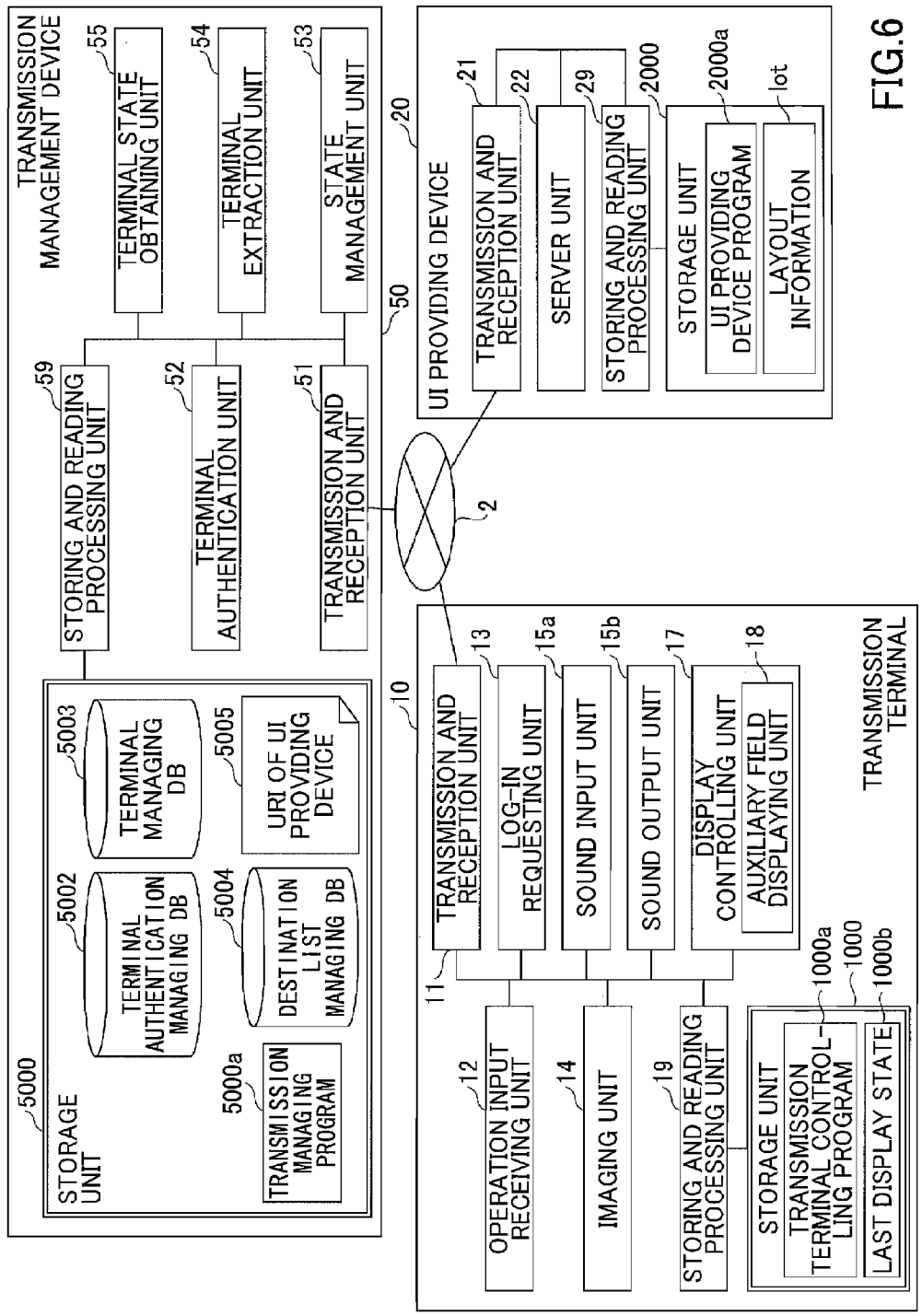
FIG. 6 is a functional block diagram of each device included in a transmission system according to an embodiment of the present invention.

FIG. 6 is a functional block diagram of each device included in the transmission system 1 according to the embodiment of the present invention. The transmission terminal 10, the relay device 30, the UI providing device 20, and the transmission management device 50 are connected such that data can be transmitted via the transmission network 2. In addition, the relay device 30 and the program providing device 90 are described where necessary. Because the information processing terminal 40 has the same functions as in the transmission terminal the transmission terminal 10 in FIG. 6 may be the information processing terminal 40.

<<Functional Configuration of Transmission Terminal>>

The transmission terminal 10 includes a transmission and reception unit 11, an operation input receiving unit 12, a log-in requesting unit 13, an imaging unit 14, a sound input unit 15a, a sound output unit 15b, a display controlling unit 17, and a storing and reading processing unit 19. These units are functions implemented by the CPU 101 that executes the transmission terminal controlling program 1000a loaded in the RAM 103 from the flash memory 104. Further, the transmission terminal 10 also includes a storage unit 1000 configured with the RAM 103 and the flash memory 104. The storage unit 1000 stores the transmission terminal controlling program 1000a.

(Functional Configurations of Transmission Terminal Elements)

The transmission and reception unit 11 is configured with the CPU 101, the network I/F 111, and the like. The transmission and reception unit 11 transmits or receives various types of data and information to or from another transmission terminal 10, the relay device 30, the transmission management device 50, or the program providing device 90 via the transmission network 2.

The transmission and reception unit 11 starts receiving state information indicating a state of each transmission terminal 10 as a destination candidate for a video conference from the transmission management device 50 before starting the video conference with a desired destination terminal. This state information indicates not only an operation state indicating whether each transmission terminal 10 is online or offline but also a detailed operation state indicating whether transmission is possible online, whether transmission is being performed online, and the like.

Further, the state information indicates not only the operation state of each transmission terminal 10 but also various states indicating that the cable 120c is disconnected from the transmission terminal 10, sound is output while an image is not output, sound is not output (mute), and the like in the transmission terminal 10. The following describes a case where the state information indicates the operation state of each transmission terminal 10 for ease of understanding of the present invention.

The operation input receiving unit 12 is configured with the CPU 101, the operation button 108, the power supply switch 109, and the like. The operation input receiving unit 12 receives various types of inputs performed by a user. For example, if the user switches the power supply switch 109 ON, the operation input receiving unit 12 receives a power-on to switch the transmission terminal 10 ON.

The log-in requesting unit 13 is configured with the CPU 101 and the like. The log-in requesting unit 13 transmits, upon reception of the power-on, log-in request information indicating a log-in request and an IP address of its own terminal at this moment from the transmission and reception unit 11 to the transmission management device 50 via the communication network 2.

Further, if the user switches the power supply switch 109 from ON to OFF, after the transmission and reception unit 11 transmits state information about powering OFF to the transmission management device 50, the operation input receiving unit 12 completely powers the transmission terminal 10 OFF. In accordance with this, the transmission management device 50 is able to determine that the transmission terminal 10 is powered OFF.

The imaging unit 14 is configured with the CPU 101, the camera 112, the imaging device I/F 113, and the like. The imaging unit 14 captures an image of an object and outputs image data obtained by the capturing to the transmission and reception unit 11.

The sound input unit 15*a* is configured with the CPU 101, the sound input and output I/F 116, and the like. A sound signal representing sound obtained by collecting sound via the microphone 114 is input to the sound input unit 15*a* and the sound input unit 15*a* converts the input sound signal into voice sound data.

The sound output unit 15*b* is implemented with the CPU 101, the sound input and output I/F 116, and the like. The sound output unit 15*b* converts the voice sound data into a sound signal and outputs the converted sound signal to the loudspeaker 115 so as to cause the loudspeaker 115 to output sound.

The display controlling unit 17 is configured with the CPU 101, the display screen I/F 117, and the like. The display controlling unit 17 combines image data having different resolution that is received at the transmission and reception unit 11 and transmits the combined image data to the display screen panel 120 so as to cause the display screen panel 120 to display an image represented by the image data.

Further, the display controlling unit 17 transmits destination list information to the display screen panel 120, the destination list information being received by the transmission and reception unit 11 from the transmission management device 50, so as to cause the display screen panel 120 to display a destination list.

The display controlling unit 17 includes an auxiliary field displaying unit 18. The auxiliary field displaying unit 18 displays the number of locations and the like that are participating in a conference in an auxiliary field of a full screen if the transmission terminal 10 is in the full screen display mode described below.

The storing and reading processing unit 19 is configured with the CPU 101, the SSD 105, and the like. The storing and reading processing unit 19 stores various types of data in the storage unit 1000 and reads various types of data stored in the storage unit 1000.

The storage unit 1000 stores an identifier (also called identification information, hereafter, "terminal ID") to identify the transmission terminal 10, a password, and the like. Further, the storage unit 1000 is also used as a reception buffer for image data and voice sound data that are received when a video conference is held with a destination terminal. Further, the storage unit 1000 stores a last display state 1000*b* (standard or simplified display) of the auxiliary field The terminal ID in the embodiment indicates information such as a language, characters, symbols, or various types of signs used to uniquely identify the transmission terminal 10. Further, the terminal ID may be information in which at least two of the language, the characters, the symbols, and various types of signs are combined.

<Functional Configuration of Transmission Management Device>

The transmission management device 50 includes a transmission and reception unit 51, terminal authentication unit 52, a state management unit 53, a terminal extraction unit 54, a terminal state obtaining unit 55, and a storing and reading processing unit 59. These units are functions implemented by the CPU 201 that executes a transmission managing program 5000*a* loaded in the RAM 203 from the HD 204. Further, the transmission management device 50 also includes a storage unit 5000 configured with the HD 204. In the following, databases included in the storage unit 5000 are described.

TABLE 1

(Terminal authentication management table)

| Terminal ID | Password |
|---|---|
| 01aa | aaaa |
| 01ab | abab |
| 01ba | baba |
| ... | ... |

In the storage unit 5000, a terminal authentication managing database (DB) 5002 having terminal authentication management table as depicted in Table 1 is constructed. In the terminal authentication management table, for each terminal ID of transmission terminals 10 managed by the transmission management device 50, a password is managed in association with the terminal ID. For example, in the terminal authentication management table depicted in Table 1, a terminal ID of the transmission terminal 10*aa* is "01aa" and a corresponding password is "aaaa."

TABLE 2

(Terminal management table)

| Terminal ID | Terminal name | Operation state | Reception date and time | IP address of terminal |
|---|---|---|---|---|
| (a) | | | | |
| 01aa | Japan, Tokyo office, terminal AA | Online (transmission is possible) | 2009.11.10.13:40 | 1.2.1.3 |
| 01ab | Japan, Tokyo office, Terminal AB | Offline | 2009.11.09.12:00 | 1.2.1.4 |
| ... | ... | ... | ... | ... |
| 01ba | Japan, Osaka office, Terminal BA | Online (transmission is possible) | 2009.11.10.13:45 | 1.2.2.3 |

TABLE 2-continued (Terminal management table)

| Terminal ID | Terminal name | Operation state | Reception date and time | IP address of terminal |
|---|---|---|---|---|
| 01bb | Japan, Osaka office, terminal BB | Online (transmission is possible) | 2009.11.10.13:50 | 1.2.2.4 |
| ... | ... | ... | ... | ... |
| 01ca | United States, New York office, Terminal CA | Offline | 2009.11.10.12:45 | 1.3.1.3 |
| 01cb | United States, New York office, Terminal CB | Online (transmitting) | 2009.11.10.13:55 | 1.3.1.4 |
| ... | ... | ... | ... | ... |
| 01da | United States, Washington D.C. office, Terminal DA | Offline | 2009.11.08.12:45 | 1.3.2.3 |
| 01db | United States, Washington D.C. office, Terminal DB | Online (transmitting) | 2009.11.10.12:45 | 1.3.2.4 |
| ... | ... | ... | ... | ... |
| (b) | | | | |
| 01aa | Japan, Tokyo office, terminal AA | Online (transmitting) | 2009.11.10.13:40 | 1.2.1.3 |
| 01ab | Japan, Tokyo office, Terminal AB | Offline | 2009.11.09.12:00 | 1.2.1.4 |
| ... | ... | ... | ... | ... |
| 01ba | Japan, Osaka office, Terminal BA | Online (transmission is possible) | 2009.11.10.13:45 | 1.2.2.3 |
| 01bb | Japan, Osaka office, terminal BB | Online (transmission is possible) | 2009.11.10.13:50 | 1.2.2.4 |
| ... | ... | ... | ... | ... |
| 01ca | United States, New York office, Terminal CA | Offline | 2009.11.10.12:45 | 1.3.1.3 |
| 01cb | United States, New York office, Terminal CB | Online (transmitting) | 2009.11.10.13:55 | 1.3.1.4 |
| ... | ... | ... | ... | ... |
| 01da | United States, Washington D.C. office, Terminal DA | Offline | 2009.11.08.12:45 | 1.3.2.3 |
| 01db | United States, Washington D.C. office, Terminal DB | Online (transmitting) | 2009.11.10.12:45 | 1.3.2.4 |
| ... | ... | ... | ... | ... |

Further, in the storage unit 5000, terminal managing DE 5003 having a terminal management table as depicted in Table 2 is constructed. Table 2-(a) depicts the terminal management table in a state where the transmission terminal 10aa having a terminal ID "01aa" has logged in. Table 2-(b) depicts the terminal management table in a state where the transmission terminal 10aa having the terminal ID "01aa" transmitted start request information to be described later.

In the terminal management table, for each terminal ID of the transmission terminals 10, an identification name (hereafter referred to as a "terminal name") of each transmission terminal 10, an operation state of each transmission terminal 10, reception date and time, and an IP address of each transmission terminal 10 are associated and managed. The reception date and time indicates when log-in request information for logging in the transmission system 1 is received by the transmission management device 50.

For example, in the terminal management table depicted in Table 2-(a), for the transmission terminal 10aa having the terminal ID "01aa," the terminal name is "Japan, Tokyo office, terminal AA," the operation state is "Online (transmission is possible)," the date and time when the log-in request information is received by the transmission management device 50 is "2009.11.10.13:40," and the IP address of the transmission terminal 10aa is "1.2.1.3."

In this case, before the log-in request information is transmitted in step S22 in FIG. 7 below, the terminal ID in the terminal management table is uniquely assigned to the transmission terminal 10 when the transmission terminal 10 is registered in the transmission system 1. The terminal name is registered or changed by an administrator of the transmission management device 50. In addition, the terminal name may be registered or changed in response to a request sent from the transmission terminal 10 to the transmission management device 50.

Further, the operation state "Online (transmission is possible)" indicates that the transmission terminal 10 has logged in the transmission system 1 but the transmission terminal 10 is not participating in a video conference. The operation state "Online (transmitting)" indicates that the transmission terminal 10 has logged in the transmission system 1 and the transmission terminal 10 is participating in the video conference. The operation state "Offline" indicates that the transmission terminal 10 has not logged in the transmission system 1. Transmission terminals 10 that are participating in the video conference have the operation state "Online (transmitting)."

TABLE 3

(Destination list management table)

| Requestor terminal ID | Destination terminal ID |
|---|---|
| 01aa | 01ab, 01ba, 01db |
| 01ab | 01aa, 01ca, 01cb |
| 01ba | 01aa, 01ab, 01ca, 01cb, 01da, 01db |
| ... | ... |
| 01db | 01aa, 01cb, 01db, 01bb, 01cc, 01dd, 01ee, 01ff, 01gg, 01hh |

Further, in the storage unit 5000, a destination list managing DE 5004 having a destination list management table as depicted in Table 3 is constructed. In the destination list management table, for the terminal ID of a reguestor terminal that sends a request to start a video conference, all of terminal IDs of terminals registered as candidates for a destination terminal are associated and managed.

For example, the candidates for a destination terminal to which the transmission terminal 10aa having the terminal ID "01aa" sends the request to start a video conference are described as the transmission terminal 10ab having the terminal ID "01ab", the transmission terminal 10ba having the terminal ID "01ba," and the transmission terminal 10db having the terminal ID "01db." The candidates for a destination terminal are added or deleted in response to a request sent from the transmission terminal 10 to the transmission management device 50.

Further, in the destination list management table, candidates for a destination terminal to which the request to start a video conference is sent are registered. Transmission terminals 10 that can participate in the video conference are not limited to those transmission terminals 10 registered in the destination list management table.
(URI of UI Providing Device)

Further, the storage unit 5000 stores a Uniform Resource Identifier (URI) 5005 of the UI providing device 20, The URI 5005 of the UI providing device 20 is set by an administrator of the transmission management device 50 or the UI providing device 20.
(Functional Configuration of Transmission Management Device Elements)

The transmission and reception unit 51 is configured with the CPU 201, the network I/F 209, and the like. The transmission and reception unit 51 transmits or receives various types of data and information to or from the transmission terminal 10, the relay device 30, or the program providing device 90 via the transmission network 2.

The terminal authentication unit 52 is configured with the CPU 101 and the like. The terminal authentication unit 52 searches the terminal authentication managing DB 5002 while using a terminal ID and a password as a search key, the terminal ID and the password being included in log-in request information received via the transmission and reception unit 51. The terminal authentication unit 52 performs terminal authentication by determining whether the same terminal ID and the password are managed in the terminal authentication managing DB 5002. In addition, an authentication method is not limited to this but a client certificate (an authentication method in which a public key and a private key are used) may be used.

The state management unit 53 is configured with the CPU 101 and the like. The state management unit 53 manages an operation state of a requestor terminal that sends a log-in request. In other words, for a terminal ID of the requestor terminal, an operation state, a reception date and time when log-in request information is received by the transmission management device 50, and an IP address are associated and managed in the terminal managing database DB 5003.

Further, a user may switch the power supply switch 109 of the transmission terminal 10 from ON to OFF. Based on state information about powering OFF transmitted in response to this from the transmission terminal 10, the state management unit 53 changes the operation state of the transmission terminal 10 from online to offline in the terminal managing database DB 5003.

The terminal extraction unit 54 is configured with the CPU 101 and the like. The terminal extraction unit 54 searches the destination list managing DB 5004 while using, as a search key, the terminal ID of the requestor terminal that sent a log-in request and extracts terminal IDs of candidates for a destination terminal with respect to the requestor terminal.

Further, the terminal extraction unit 54 also searches the destination list managing DB 5004 while using, as a search key, the terminal ID of the requestor terminal that sent the log-in request and extracts terminal IDs of other requestor terminals that register the terminal ID of the requestor terminal as a candidate for a destination terminal.

The terminal state obtaining unit 55 is configured with the CPU 101 and the like. The terminal state obtaining unit 55 searches the terminal managing database DB 5003 while using, as a search key, the terminal ID of the candidate for the destination terminal extracted by the terminal extraction unit 54 and reads the operation state in each detected terminal ID.

In accordance with this, the terminal state obtaining unit 55 can obtain the operation state of the candidates for a destination terminal with respect to the requestor terminal that sends the log-in request. Further, the terminal state obtaining unit 55 searches the terminal managing database DB 5003 while using, as a search key, the terminal ID extracted by the terminal extraction unit 54 and obtains the operation state of the requestor terminal that sends the log-in request.

The storing and reading processing unit 59 is configured with the CPU 101, the HDD 205, and the like. The storing and reading processing unit stores various types of data in the storage unit 5000 and reads various types of data stored in the storage unit 5000.

<<Functional Configuration of UI Providing Device>>

The UI providing device 20 includes a transmission and reception unit 21, a server unit 22, and a storing and reading processing unit 29. These units are functions implemented by the CPU 201 that executes a UI providing device program 2000a loaded in the RAM 203 from the HD 204. Further, the UI providing device 20 also includes a storage unit 2000 configured with the HD 204. The storage unit 2000 stores layout information "lot."
(Functional Configuration of UI Providing Device Elements)

The transmission and reception unit 1 is configured with the CPU 201, the network I/F 209, and the like. The transmission and reception unit 21 transmits or receives various types of data and information to or from the transmission terminal 10 via the transmission network 2.

The server unit 22 is configured with the CPU 201 and the like. The server unit 22 receives a layout information requesting signal from the transmission terminal 10 and transmits the layout information "lot" to the transmission terminal 10 via the transmission and reception unit 21, the layout information "lot" being read by the storing and reading processing unit 29 from the storage unit 2000.

The storing and reading processing unit 29 is configured with the CPU 201 and the like. The storing and reading processing unit 29 stores various types of data in the storage unit 2000 and reads various types of data stored in the storage unit 2000. The storage unit 2000 is configured with the ROM 202, the RAM 203, the HDD 205, and the like. The storage unit 2000 mainly stores the UI providing device program 2000a and the layout information "lot."
<Process or Operation in Embodiment>

In the following, an operation of the transmission system 1 in the embodiment is described. FIG. 7 is a sequence diagram depicting a preparation stage operation until the transmission terminal 10 is in a prepared state for participating in a video conference according to the embodiment f the present invention. FIG. 7 depicts an example where the transmission terminal 10aa achieves the prepared state. In the preparation stage operation, various types of information are transmitted and received in the management information session "sei" (see FIG. 2).

First, when a user of the transmission terminal 10aa switches ON the power supply switch 109 of the transmission terminal 10aa, the operation input receiving unit 12 receives a power-on to switch the transmission terminal 10aa ON (step S21). The log-in requesting unit 13 transmits, upon reception of the power-on, log-in request information indicating a log-in request from the transmission and reception unit 11 of the transmission terminal 10aa to the transmission management device 50 via the communication network 2 (step S22).

In the log-in request information, a terminal ID for identifying the transmission terminal 10aa as a log-in requestor and a password are included. These terminal ID and the password are read by the storing and reading processing unit 19 from the storage unit 1000.

When the log-in request information transmitted from the transmission terminal 10*aa* is received by the transmission management device 50, the transmission management device 50 can determine an IP address of the transmission terminal 10*aa* on a transmission side.

Next, the terminal authentication unit 52 of the transmission management device 50 searches the terminal authentication managing DB 5002 of the storage unit 5000 while using, as a search key, the terminal ID and the password included in the log-in request information received via the transmission and reception unit 51. The terminal authentication unit 52 performs terminal authentication by determining whether the same terminal ID and the password as in the search key are managed in the terminal authentication managing DB 5002 (step S23).

There is a case where the terminal authentication unit 52 determines that the same terminal ID and the password as in the search key are not managed, namely, a case where the terminal authentication unit 52 determines that the log-in request is not sent from an authorized transmission terminal 10. In this case, the transmission and reception unit 51 transmits, via the transmission network 2, authentication result information indicative of an authentication result obtained by the terminal authentication unit 52 to the transmission terminal 10*aa* that sent the log-in request and the preparation stage operation ends.

By contrast, there is a case where the terminal authentication unit 52 determines that the same terminal ID and the password as in the search key are managed, namely, a case where the terminal authentication unit 52 determines that the log-in request is sent from an authorized transmission terminal 10, In this case, the state management unit 53 stores the terminal ID of the transmission terminal 10*aa*, an operation state, a reception date and time when the log-in request information is received, and the IP address of the transmission terminal 10*aa* in the terminal managing database DB 5003 in an associated manner (step S24).

In accordance with this, as depicted in Table 2-(a), the terminal management table manages the terminal ID "01aa," the operation state "Online (transmission is possible)," the reception date and time "2009.11.10.13:40," and the IP address of the transmission terminal 10*aa* "1.2.1.3." in an associated manner.

Next, the transmission and reception unit 51 of the transmission management device 50 transmits, via the transmission network 2, authentication result information indicative of an authentication result obtained by the terminal authentication unit 52 to the transmission terminal 10*aa* that sent the log-in request (step S25). Further, the transmission management device 50 transmits the URI 5005 of the UI providing device 20 to the transmission terminal 10*aa* together with the authentication result information or before or after the authentication result information. In accordance with this, the transmission terminal 10*aa* can access the UI providing device 20.

The URI 5005 of the UI providing device 20 indicates a location where the layout information "lot" is stored in the transmission network 2. The URI 5005 is in a format such as "IP address (or domain name) folder name file name," the format may be changed as long as URI 5005 allows access to the UI providing device 20.

Because the transmission terminal 10 does not have the URI 5005, an administrator of the transmission management device 50 has only to change the URI 5005 stored in the transmission management device 50 even if the UI providing device 20 is replaced or the URI 5005 is changed. In other words, it is not necessary to change the URI 5005 for all of the transmission terminals 10, so that workload of management can be reduced.

Next, the terminal extraction unit 54 of the transmission management device 50 searches the destination list managing DB 5004 while using, as a search key, the terminal ID "01aa" of the transmission terminal 10*aa* that sent the log-in request and extracts terminal IDs of candidates for a destination terminal with respect to the transmission terminal 10*aa* (step S26).

In this case, the terminal IDs "01ab," "01ba," and "01db" of the transmission terminals 10*ab*, 10*ba*, and 10*db* as the candidates for the destination terminal are extracted for the terminal ID "01aa" of the transmission terminal 10*aa*.

Next, the terminal state obtaining unit 55 of the transmission management device 50 searches the terminal managing database DB 5003 while using, as a search key, the terminal IDs "01ab," "01ba," and "01db" of the candidates for the destination terminal extracted by the terminal extraction unit 54. The terminal state obtaining unit 55 obtains operation states of the transmission terminals 10*ab*, 10*ba*, and 10*db* by reading the operation states "Offline," "Online (transmission is possible)," and "Online (transmitting)" in each terminal ID extracted by the terminal extraction unit 54 (step S27).

Next, the transmission and reception unit 51 of the transmission management device 50 includes, in destination state information, the terminal IDs "01ab," "01ba," and "01db" used as the search key in step S27 and the operation states "Offline," "Online (transmission is possible)," and "Online (transmitting) of the corresponding transmission terminals 10*ab*, 10*ba*, and 10*db*. The transmission and reception unit 51 transmits the destination state information to the transmission terminal 10*aa* via the transmission network 2 (step S28).

In accordance with this, the transmission terminal 10*aa* can determine the operation states of the transmission terminals 10*ab*, 10*ba*, and 10*db* at this moment as the candidates for the destination terminal, namely, "Offline," "Online (transmission is possible)," and "Online (transmitting).

Further, the terminal extraction unit 54 of the transmission management device 50 searches the destination list managing DB 5004 while using, as a search key, the terminal ID "01aa" of the transmission terminal 10*aa* that sent the log-in request. The terminal extraction unit 54 extracts terminal IDs of other transmission terminals that register the terminal ID "01aa" of the transmission terminal 10*aa* as a candidate for a destination terminal (step S29). For example, terminal IDs "01ab," "01ba," and "01db" are extracted from the destination list management table of Table 3.

Next, the state management unit 53 of the transmission management device 50 searches the terminal managing database DB 5003 while using, as a search key, the terminal ID "01aa" of the transmission terminal 10*aa* that sent the log-in request. The state management unit 53 obtains an operation state "Online (transmission is possible)" of the transmission terminal 10*aa* that sent the log-in request (step S30).

Next, the transmission and reception unit 51 of the transmission management device 50 determines the transmission terminals 10*ba* and 10*db* having the operation state "Online" in the terminal managing database DB 5003 among the transmission terminals 10*ab*, 10*ba*, and 10*db* identified with the terminal IDs "01ab," "01ba," and "01db" extracted in step S29. The transmission and reception unit 51 transmits the destination state information in which the terminal ID "01aa" of the transmission terminal 10aa and the operation state "Online (transmission is possible)" obtained in step S30 are included (steps S31-1, S31-2).

In addition, upon transmitting the destination state information to the transmission terminals 10ba and 10db, the transmission and reception unit 51 refers to IP addresses of transmission terminals 10 managed in the terminal management table depicted in Table 2-(a) based on the terminal IDs "01ba" and "01db."

In accordance with this, it is possible to report the terminal ID "01aa" of the transmission terminal 10aa that sent the log-in request and the operation state "Online (transmission is possible)" to the transmission terminals 10ba and 10db that can perform transmission to the transmission terminal 10aa which sent the log-in request as a destination.

Further, when the step S28 in the preparation stage operation is completed, the display controlling unit 17 of the transmission terminal 10aa causes, from information about a destination list displayed on the display screen panel 120, the display screen panel 120 to emphatically display terminals that are participating in a video conference. In other words, it is possible to allow a user to notice a transmission terminal 10 that is participating in the video conference or a transmission terminal 10 that can participate in the video conference by causing the display screen panel 120 to emphatically display information about transmission terminals 10 having an operation state "Online (transmitting)" or "Online (transmission is possible)," for example.

Figure 8:
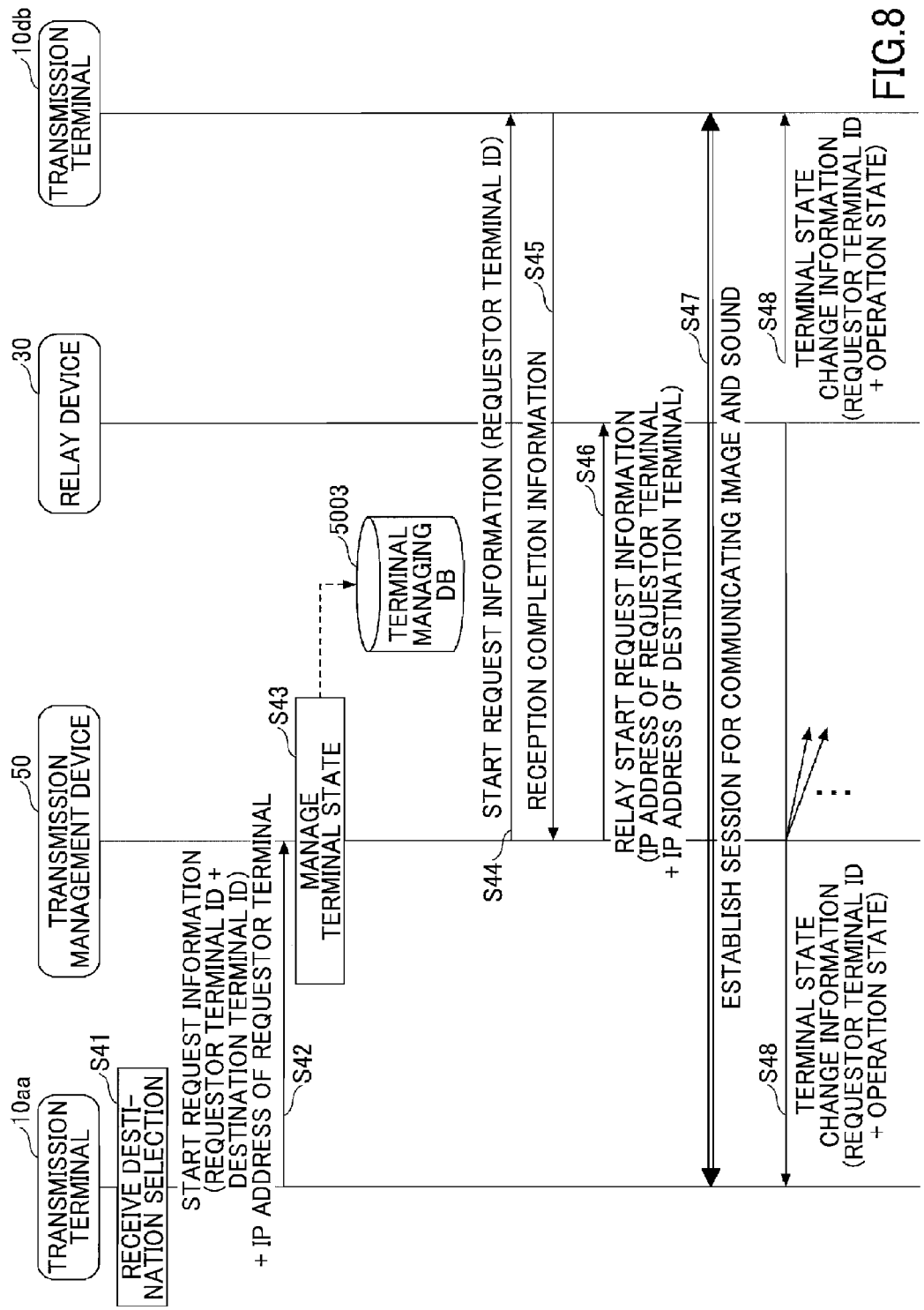
FIG. 8 is a sequence diagram depicting a conference participation operation until a transmission terminal is in a participation state for participating in a video conference according to an embodiment of the present invention.

FIG. 8 is a sequence diagram depicting a conference participation operation until the transmission terminal 10 is in a participation state for participating in a video conference according to the embodiment of the present invention. FIG. 8 depicts an example where the transmission terminal 10aa achieves the participation state. In the conference participation operation, various types of information are transmitted and received in the management information session "sei" (see FIG. 2).

First, if the user presses the operation button 108 to select participation in a video conference, the operation input receiving unit 12 receives a request to participate in a video conference with the transmission terminal 10db (step 341). In addition, in a case where the transmission terminal 10 is the information processing terminal 40, the request to participate in the video conference is received when a hard key or a soft key displayed on a touch panel of the information processing terminal 40 is pressed instead of the operation button 108.

In response to this request, the transmission and reception unit 11 of the transmission terminal 10aa transmits participation request information indicating participation in the video conference to the transmission management device 50, the participation request information including the terminal ID "01aa" of the transmission terminal 10aa and the terminal ID "01db" of the transmission terminal 10db (step S42).

In accordance with this, the transmission and reception unit 51 of the transmission management device 50 receives the participation request information and can determine the IP address "1.2.1.3" of the transmission terminal 10aa as a transmission source.

Next, the state management unit 53 of the transmission management device 50 uses, as a search key, the terminal ID "01aa" of the transmission terminal 10aa included in the participation request information. The state management unit 53 searches the terminal managing database DE 5003 and sets the operation state of the transmission terminal 10aa that sent the participation request information to "Online (transmitting)" (step S43). In accordance with this, the operation state in the terminal management table is updated as depicted in Table 2-(b).

Next, the transmission and reception unit 51 of the transmission management device 50 transmit, start request information including the terminal ID "01aa" of the transmission terminal 10aa to the transmission terminal 10db via the transmission network 2 (step S44). In accordance with this, the transmission terminal 10db can determine which transmission terminal 10 sent a request to participate in the video conference.

Although a description is omitted for ease of understanding the invention, in the terminal managing database DB 5003 depicted in Table 2-(b), the operation state of the transmission terminal 10cb is also "Online (transmitting)." Accordingly, the transmission and reception unit 51 of the transmission management device 50 transmits the start request information including the terminal ID "01aa" of the transmission terminal 10aa to the transmission terminal 10cb via the transmission network 2.

Next, the transmission terminal 10db transmits reception completion information indicating that reception of the start request information is completed from the transmission and reception unit 11 to the transmission management device 50 via the transmission network 2 (step S45).

Next, the transmission and reception unit 51 of the transmission management device 50 transmit, relay start request information indicating a request to start relay to the relay device 30 via the transmission network 2 (step S46). The relay start request information includes the IP addresses "1.2.1.3" and "1.3.2.4" of the transmission terminal 10aa and the transmission terminal 10db.

In accordance with this, the relay device 30 establishes a session for transmitting three types of image data including low resolution, intermediate resolution, and high resolution, and voice sound data between the transmission terminal 10aa and the transmission terminal 10db (step S47). In this manner, the transmission terminal 10aa can participate in the video conference with the transmission terminal 10db.

The transmission and reception unit 51 of the transmission management device 50 transmits terminal state change information including the terminal ID "01aa" of the transmission terminal 10aa and the operation state "Online (transmitting)" to each transmission terminal 10 registered in the terminal managing database DB 5003 (step S48). In accordance with this, each transmission terminal 10 that receives the terminal state change information can store and display, where necessary, the operation state of transmission terminal 10aa having the terminal ID "01aa."

When the session is established, the transmission terminal 10aa can display image data and output voice sound data transmitted from the transmission terminal 10db. The transmission terminal 10db can display image data and output voice sound data transmitted from the transmission terminal 10aa. Even if three or more transmission terminals 10 participate in the video conference, image data and voice sound data are transmitted in the same manner as in the case of two transmission terminals 10. Alternatively, the image data and voice sound data may be transmitted without the relay device 30 in the case of two transmission terminals 10 and the image data and voice sound data may be transmitted in a communication protocol via the relay device 30 in the case of three or more transmission terminals 10.

<Two Display Modes of Transmission Terminal 10>

In the following, image display in the transmission terminal 10 is described. In the embodiment, the display controlling unit 17 has two display modes including the full screen display mode and the information display mode.

<<Full Screen Display Mode>>

Figure 9:
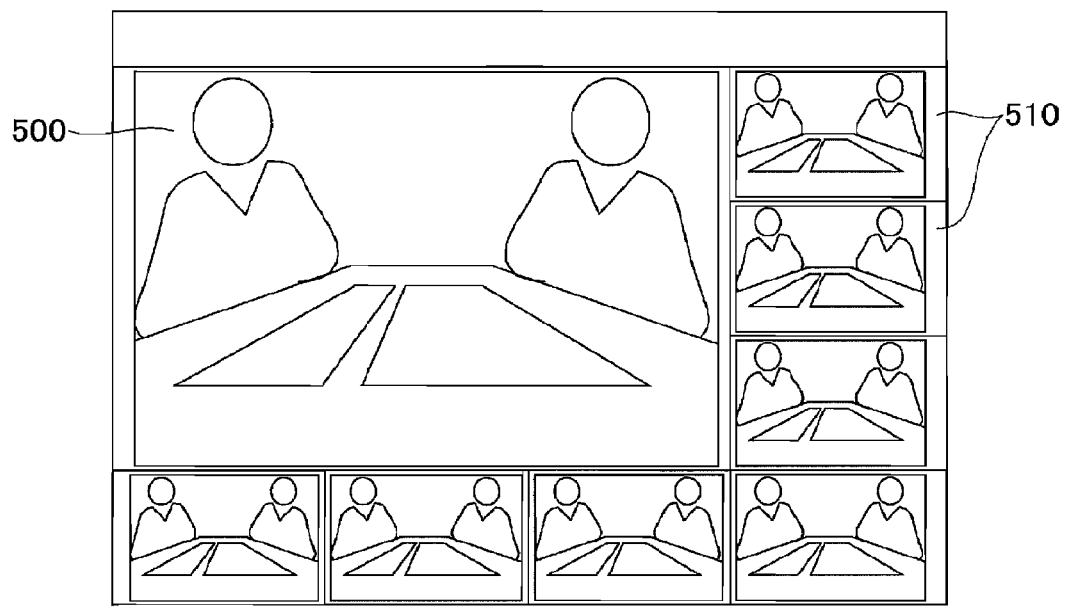
FIG. 9 is a diagram depicting a screen rendered on a display screen panel in a full screen display mode according to an embodiment of the present invention.

The full screen display mode is described with reference to FIG. 9. FIG. 9 is a diagram depicting a screen rendered on the display screen panel 120 in the full screen display mode according to the embodiment of the present invention. This screen in FIG. 9 is referred to as a "full screen." The full screen display mode is displayed when the session is established in step S47 of FIG. 8 and transmission or reception of image data and voice sound data starts. In other words, of the two display modes, the full screen display mode is a display mode that is mainly used during a video conference.

In the full screen display mode, the display controlling unit 17 of the transmission terminal 10 causes the display screen panel 120 to display all images transmitted from each transmission terminal 10 that is participating in the video conference. If each display field becomes small by displaying all the images, an image of an upper limit value (maximum value) determined in advance is displayed.

In the full screen illustrated in FIG. 9, a first image field 500 which is relatively large and a plurality of second image fields 510 which are relatively small are allocated. For example, in each second image field 510, an image represented by image data transmitted from each transmission terminal 10 that is participating in the video conference is displayed. In the first image field 500, an image represented by image data transmitted from a main transmission terminal 10 among transmission terminals 10 that are participating in the video conference is displayed.

The display controlling unit 17 specifies, among the transmission terminals 10 that are participating in the video conference, one transmission terminal 10 that transmits voice sound data representing voice sound among received voice sound data, as the main transmission terminal 10. In this case, the voice sound data representing voice sound refers to voice sound data obtained by detecting voice activity from each set of the received voice sound data and determining a set of voice sound data as having the voice activity. In addition, it is possible to realize the detection of the voice activity by using a technique in the related art (see Non-patent Document 1, for example).

The full screen illustrated in FIG. 9 is only an example. In the full screen display mode, it is possible to configure all of a plurality of image fields to have the same size and display each image or it is possible to display only an image of the above main transmission terminal 10 on the entire part of the display screen panel 120.

<<Information Display Mode>>

The information display mode is described below. If the user operates the operation button 108, for example, it is possible to switch the two display modes alternately. In a case where the transmission terminal 10 is the information processing terminal 40, it is possible to switch the two display modes alternately by pressing a hard key or a soft key displayed on a touch panel of the information processing terminal 40 instead of the operation button 108.

Figure 10:
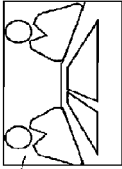
FIG. 10 is a diagram depicting a screen rendered on a display screen panel in a full screen display mode according to an embodiment of the present invention.

FIG. 10 is a diagram depicting a screen (hereafter "information display screen") rendered on the display screen panel 120 in the full screen display mode according to the embodiment of the present invention. As illustrated in FIG. 10, in the information display mode, the display controlling unit 17 of the transmission terminal 10 causes the display screen panel 120 to display terminal information including at least a sequential number 614, a terminal name 615, and a terminal ID 616 of each transmission terminal 10 that is participating in the video conference. The sequential number 614 is a number assigned to each terminal in order of participation or the like and the largest number of the sequential numbers 614 indicates the number of locations (number of terminals) that are participating in the video conference.

In the information display screen illustrated in FIG. 10, an image displaying field 520 for displaying an image and a terminal information displaying field 530 for displaying terminal information are allocated. For example, in the terminal information displaying field 530, terminal information about the transmission terminals 10 that are participating in the video conference is displayed in a list.

In addition, an item whose terminal name 615 is not displayed in the terminal information in the list represents a transmission terminal 10 that is not registered in the destination list managing DB 5004 as a candidate for a destination terminal of its own terminal.

For example, in the information display screen illustrated in FIG. 10, the terminal name 615 of the transmission terminal 10*db* is displayed because the transmission terminal 10*db* is registered in the destination list managing DB 5004 as a candidate for a destination terminal of the transmission terminal 10*aa* as depicted in Table 3. The terminal name 615 of the transmission terminal 10*cb* is not displayed because the transmission terminal 10*cb* is not registered in the destination list managing DB 5004 as a candidate for a destination terminal of the transmission terminal 10*aa*.

In the image displaying field 520, an image represented by image data from the main transmission terminal 10 among the transmission terminals 10 that are participating in the video conference is displayed. For example, the display controlling unit 17 specifies, among the transmission terminals 10 that are participating in the video conference, one transmission terminal 10 that transmits voice sound data representing voice sound among received voice sound data, as the main transmission terminal 10. Further, when the operation input receiving unit receives selection of one transmission terminal 10 among the transmission terminals 10 that are participating in the video conference, the display controlling unit 17 may specify the selected transmission terminal 10 as the main transmission terminal 10. In a case where the transmission terminal 10 is the information processing terminal 40, a transmission terminal 10 selected by pressing a hard key or a soft key displayed on a touch panel of the information processing terminal 40 instead of the operation button 108 is specified as the main transmission terminal 10.

Further, as illustrated in FIG. 10, if locations that are participating in the video conference cannot be displayed in a single screen, a scroll bar 613 is displayed. The user can display information about locations arranged outside the information display screen by operating the operation button 108.

(Procedure for Displaying Information Display Screen)

Figure 11:
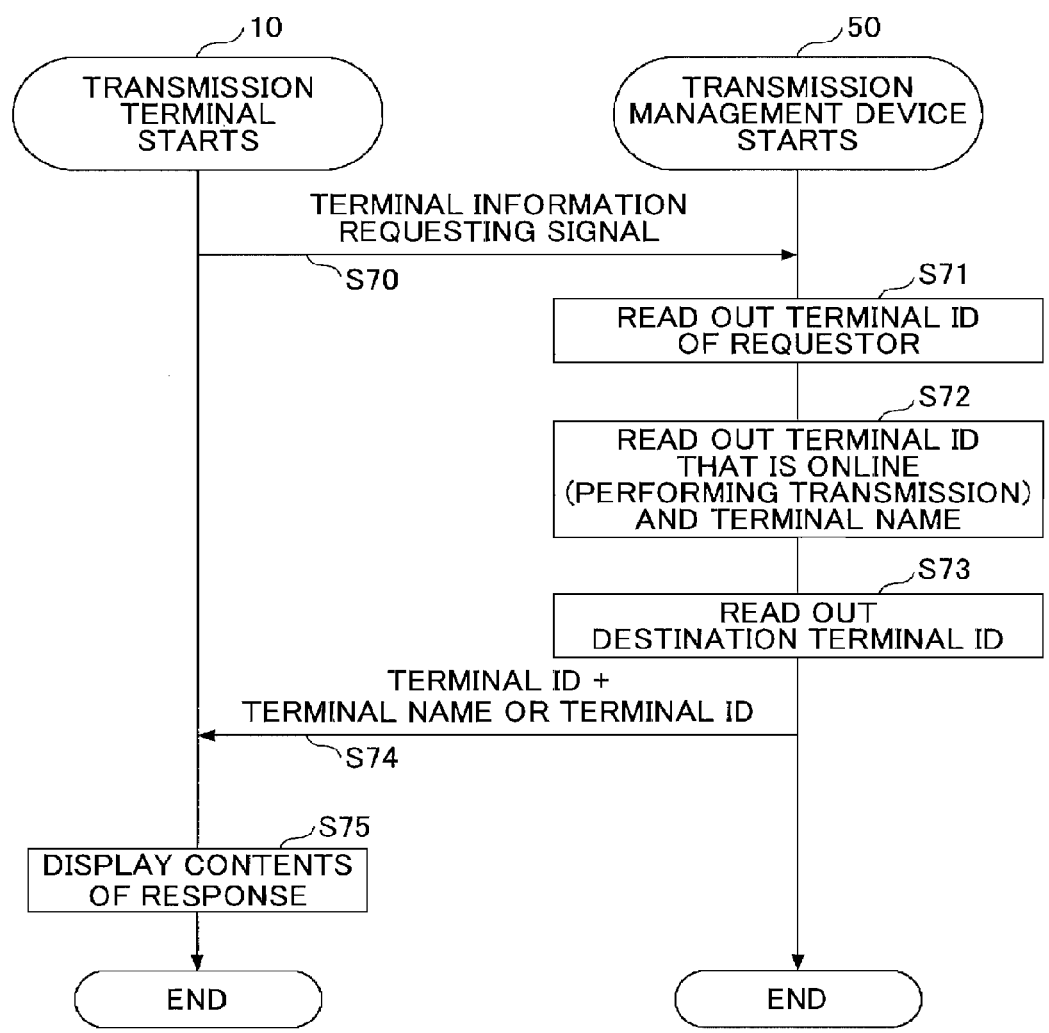
FIG. 11 is a sequence diagram depicting a terminal information display operation for displaying terminal information in a terminal information displaying field when a transmission terminal is switched to an information display mode according to an embodiment of the present invention.

FIG. 11 is a sequence diagram depicting a terminal information display operation for displaying terminal information in the terminal information displaying field 530 when the transmission terminal 10 is switched to the information display mode according to the embodiment of the present invention. In the terminal information display operation illustrated in FIG. 11, various types of information are transmitted and received in the management information session "sei".

First, the transmission terminal 10 transmits, to the transmission management device 50, a terminal information requesting signal indicating a request for terminal information about transmission terminals 10 that are participating in the video conference (step S70).

The terminal state obtaining unit 55 of the transmission management device 50 that receives the terminal information requesting signal searches the terminal managing database DB 5003 of the storage unit 5000 while using, as a search key, the IP address of the transmission terminal 10 that transmits the terminal information requesting signal. The terminal state obtaining unit 55 obtains a terminal ID of the transmission terminal 10 that transmitted the terminal information requesting signal (step S71).

Next, the terminal state obtaining unit 55 searches the terminal managing database DB 5003 and detects terminal IDs and terminal names whose operation state is "Online (transmitting)" (step S72). In the embodiment, the terminals IDs detected by the terminal state obtaining unit 55 are "01aa," "01cb," and "01db." In addition, the operation state of the transmission terminal 10 having the terminal ID "01aa" is set to "Online (transmitting)" in step S43.

Next, the terminal state obtaining unit 55 searches the destination list managing DB 5004 of the storage unit 5000 while using, as a search key, the terminal ID ("01aa" in the embodiment) detected in step S71 and obtains terminal IDs of candidates for a destination terminal with respect to the transmission terminal 10 that transmitted the terminal information requesting signal (step S73).

For example, if the terminal ID of the transmission terminal 10 that transmitted the terminal information requesting signal is "01aa," terminal IDs obtained by the terminal state obtaining unit 55 are "01ab," "01ba," and "01db."

Next, the terminal state obtaining unit 55 determines whether the terminal ID obtained in step S72 is included in the terminal ID of the transmission terminal 10 that transmitted the terminal information requesting signal or the terminal IDs obtained in step S73. If the terminal ID is determined as included, the terminal state obtaining unit 55 causes the transmission and reception unit 51 to report the terminal ID and the terminal name to the transmission terminal 10 that transmitted the terminal information requesting signal. If the terminal ID is not determined as included, the terminal state obtaining unit 55 causes the transmission and reception unit 51 to report only the terminal ID to the transmission terminal 10 that transmitted the terminal information requesting signal (step S74).

For example, it is assumed that the terminal ID of the transmission terminal 10 that transmitted the terminal information requesting signal is "01aa." In this case, the terminal IDs "01aa" and "01db" of the transmission terminals 10*aa* and 10*db* and their terminal names "Japan, Tokyo office, terminal AA" and "United States, Washington D.C. office, Terminal DB" are transmitted to the transmission terminal 10*aa* that transmitted the terminal information requesting signal.

The display controlling unit 17 of the transmission terminal 10 that receives the report displays contents of the report in the terminal information displaying field 530 as in the information display screen illustrated in FIG. 10 (step S75).

<Display of Auxiliary Field (Number of Locations) in Full Screen Display Mode>

In the full screen display mode, if locations exceeding the number of locations that can be displayed in a single screen participate in the video conference, the user may find it difficult to determine the participating locations and the number thereof. Accordingly, the transmission terminal 10 of the embodiment displays, in the full screen display mode, the number of locations that are participating in the video conference. In accordance with this, participants of the video conference can determine the number of locations in real time in the full screen display mode.

<<Auxiliary Field>>

Figure 12:
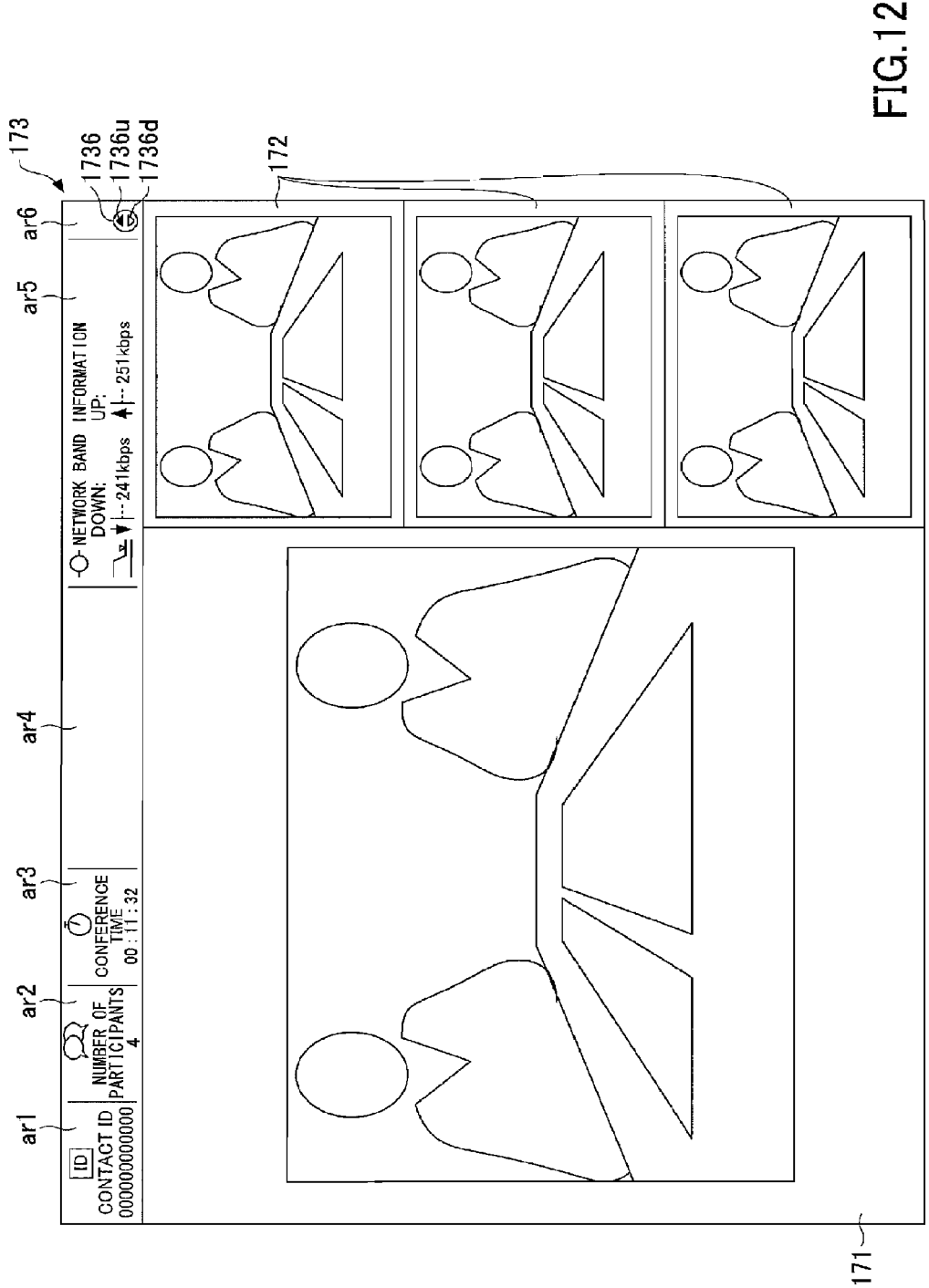
FIG. 12 is a diagram depicting a full screen in which the number of locations is displayed in a full screen display mode according to an embodiment of the present invention.

FIG. 12 is a diagram depicting a full screen in which the number of locations is displayed in the full screen display mode according to the embodiment of the present invention. The auxiliary field displaying unit 18 displays the number of locations in the auxiliary field 173 of the full screen display mode. In FIG. 12, the auxiliary field 173 is configured to be a strip-shaped margin part disposed at the top of the full screen. However, the auxiliary field 173 may be a strip-shaped margin part disposed on a right end, a left end, or the bottom of the full screen and the auxiliary field 173 may be displayed on which an image is superposed The auxiliary field 173 is divided into a first field ar1 to a sixth field ar6.

First field ar1: The terminal ID of its own terminal is displayed. A user of another transmission terminal 10 trying to participate in the same video conference with the transmission terminal 10 whose terminal ID is displayed asks this terminal ID and inputs or selects the terminal ID in the transmission terminal 10 the user is operating, so that the user can participate in the video conference.

Second field ar2: The number of locations is displayed.

Third field ar3: Conference time since a session is established is displayed.

Fourth field ar4: Any type of information may displayed.

Fifth field ar5: Network band information (uplink and downlink communication speed) is displayed.

Sixth field ar6: A cursor button 1736 is displayed. The cursor button 1736 includes an upper triangle button 1736*u* and a lower triangle button 1736*d*. The upper triangle button 1736*u* is black and the lower triangle button 1736*d* is outlined. The upper triangle button 1736*u* indicates that an operation is possible and the lower triangle button 1736*d* indicates that an operation is not possible. When the upper triangle button 1736*u* is operated, the auxiliary field 173 is displayed with simplified display as described below.

In addition, the auxiliary field 173 is preferably displayed translucently. In accordance with this, even if the auxiliary field 173 is superposed on image data transmitted and received among locations, visibility is likely to be maintained.

Further, the number of locations may be displayed in any one of the first to sixth fields. Further, if the auxiliary field 173 is not divided, the number of locations may be displayed anywhere in the auxiliary field 173. However, the divided auxiliary field 173 improves visibility of the full screen when viewed by the user.

The cursor button 1736 in the sixth field ar6 is configured to be an icon for allowing the user to understand that switching to the auxiliary field 173 with simplified display is possible. In the following, the auxiliary field illustrated in FIG. 12 is referred to as a "standard auxiliary field" to be distinguished from the auxiliary field 173 with simplified display described below.

The cursor button 1736 corresponds to two of the several operation buttons 108*a* to 108*e*. The corresponding operation buttons 108 are preferably swingable upward or downward. An operation of one of the operation buttons 108 in an upper direction corresponds to the upper triangle button 1736*u* and an operation of the other operation button 108 in a lower direction corresponds to the lower triangle button 176*d*.

In an initial setting of the transmission terminal 10, information about various types of transmission states in the first field ar1 to the sixth field ar6 of FIG. 12 is displayed in the auxiliary field 173. The user switches from the standard auxiliary field 173 to the auxiliary field 173 with simplified display by pressing the upper triangle button 1736u through an operation of the operation button 108 (or a touch panel). Further, subsequently, it is possible to perform setting so as not to display the auxiliary field 173. Details are described with reference to FIG. 15.

In a case where the transmission terminal 10 is the information processing terminal 40, it is possible to perform setting so as not to display transmission states in the first field an to the sixth field ar6 in the auxiliary field 173 by pressing a hard key or a soft key displayed on a touch panel of the information processing terminal 40 instead of the operation button 108.

In FIG. 12, images of four locations are displayed on the display screen panel 120. Accordingly, the number of locations in the second field ar2 is "4." The user can determine the number of locations that are participating in the video conference at a glance. Further, if locations exceeding the number of an upper limit of display in the transmission terminal 10 are participating in the video conference, the user can determine an actual number of locations based on the number of locations in the second field are while the number of images displayed on the display screen panel 120 remains to be the number of upper limit of display.

A layout (or arrangement) of the auxiliary field 173 is defined by the layout information "lot" stored in the storage unit 2000 of the UI providing device 20. The layout information "lot" is described based on a language such as HTML, JavaScript (registered trademark), XML, or CSS and a standard.

The layout information "lot" defines a location of the auxiliary field 173, the division of the auxiliary field 173 into the first field ar1 to the sixth field ar6 having a predetermined size, and information to be displayed in each of the first field ar1 to the sixth field ar6. Accordingly, the transmission terminal 10 that obtains the layout information "lot" from the UI providing device 20 can set and display transmission states in the first field ar1 to the sixth field ar6.

In the full screen display mode, arrangement when the transmission terminal 10 displays image data received from a destination terminal on the display screen panel 120 is determined in advance based on the number of locations or the like. In contrast, the layout information "lot" is defined separately from the layout of image data, so that it is possible to define information and the arrangement of the transmission states disposed in the auxiliary field 173 without being influenced by the layout of image data. In other words, the transmission terminal 10 can display the first field an to the sixth field ar6 in the auxiliary field 173 independently of image data. Even if the layout of image data is changed, the auxiliary field 173 is not influenced by the change.

<<Auxiliary Field with Simplified Display>>

Figure 13:
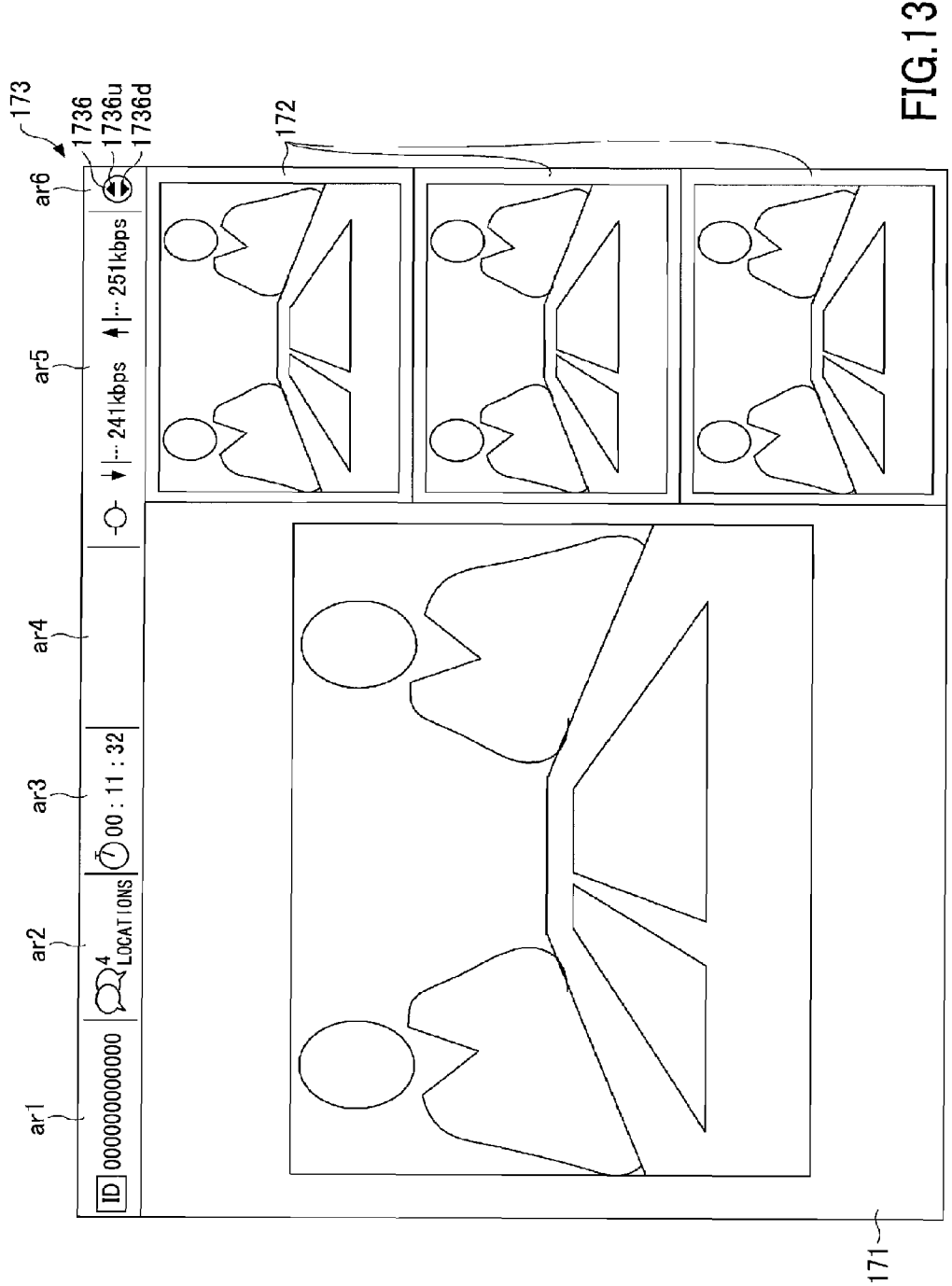
FIG. 13 is a diagram depicting an auxiliary field with simplified display according to an embodiment of the present invention.

FIG. 13 is a diagram depicting the auxiliary field 173 with simplified display according to the embodiment of the present invention. In FIG. 13, although the number of locations is the same as in FIG. 12, information about transmission states in the first field ar1 to the sixth field ar6 is displayed in a simplified manner.

In the auxiliary field 173 with simplified display, information indicative of what is displayed in each field is not displayed. The auxiliary field 173 with simplified display mainly displays only a value of a contact ID in the first field ar1, only the number of locations in the second field ar2, only the time in the third field ar3, and only the band in the fifth field ar5.

The cursor button 1736 in the sixth field ar6 has a display form different from the standard auxiliary field 173. In the auxiliary field 173 with simplified display, the upper triangle button 1736u and the lower triangle button 1736d are black. The user can operate one operation button 108 that corresponds to the upper triangle button 1736u and the other operation button 108 that corresponds to the lower triangle button 1736d.

Display in the auxiliary field 173 with simplified display is controlled as follows in response to an operation of the cursor button 1736. Lower triangle button 1736d: Switch to the standard auxiliary field 173.

Upper triangle button 1736u: Disable display of the auxiliary field 173 with simplified display (and also disable display of the standard auxiliary field 173).

The auxiliary field 173 with simplified display has an smaller area on the display screen panel 120 than the standard auxiliary field 173, so that it is possible to improve visibility of image data while displaying transmission states in the auxiliary field 173.

In addition, the auxiliary field 173 with simplified display is preferably displayed translucently in the same manner as in the standard auxiliary field 173.

<Display Procedure>

Figure 14:
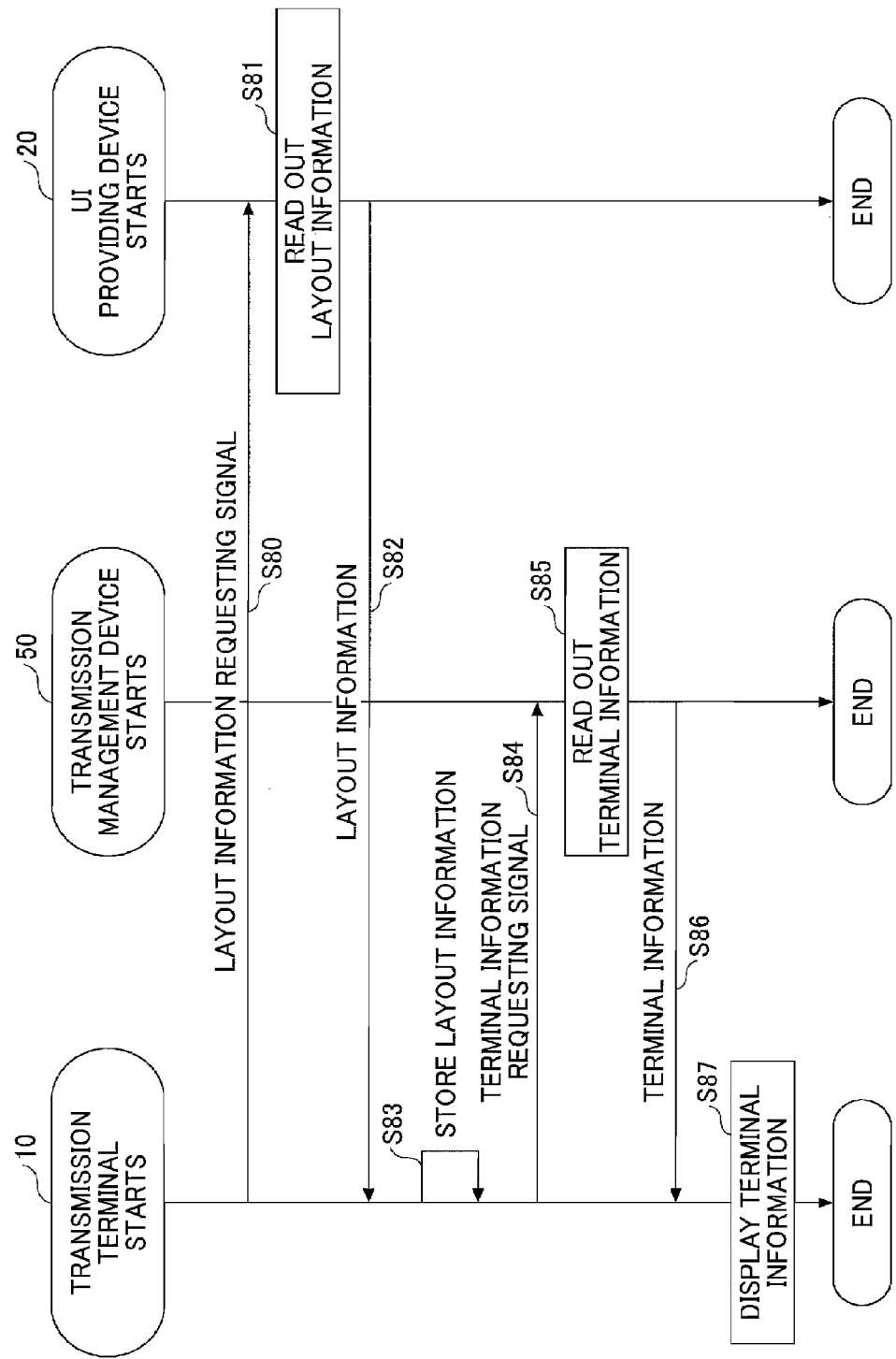
FIG. 14 is a sequence diagram depicting a procedure by which a transmission system displays the number of locations when the transmission terminal is in a full screen display mode according to an embodiment of the present invention.

FIG. 14 is a sequence diagram depicting a procedure by which the transmission system 1 displays the number of locations when the transmission terminal 10 is in the full screen display mode according to the embodiment of the present invention. After the session in step S47 of FIG. 8 is established, the procedure in FIG. 14 is performed without an operation of the operation button 108 and the like by the user. In other words, in the transmission terminal 10, an initial setting for displaying the auxiliary field 173 is set.

Further, after the session in step S47 is established, the procedure in FIG. 14 may be performed when the user presses an operation button 108 (this operation button 108 may be the same or different from the operation button 108 for controlling display of the auxiliary field 173). In addition, in a case where the transmission terminal 10 is the information processing terminal 40, the procedure is performed by pressing a hard key or a soft key displayed on a touch panel of the information processing terminal 40 instead of the operation button 108.

Figure 7:
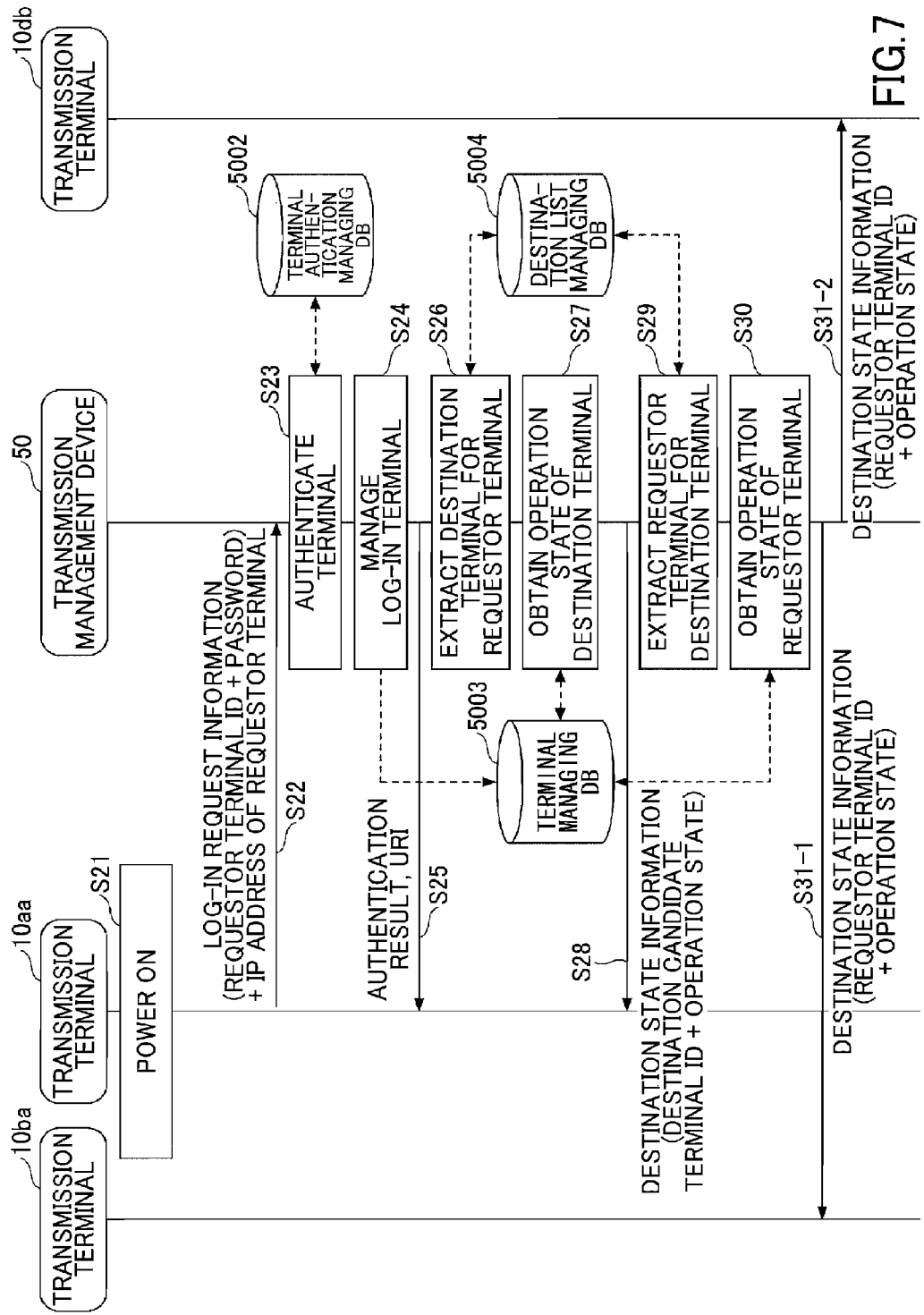
FIG. 7 is a sequence diagram depicting a preparation stage operation until a transmission terminal is in a prepared state for participating in a video conference according to an embodiment of the present invention.

First, the transmission terminal 10 specifies the URI of the UI providing device 20 obtained in step S25 of FIG. 7 and transmits a layout information requesting signal for requesting layout information "lot" to the UI providing device 20 (step S80). In addition, instead of obtaining the URI of the UI providing device 20 in step S25 of FIG. 7, the URI may be obtained by the transmission terminal 10 from the transmission management device 50 immediately before the step S80 or the URI may be obtained when the user presses the operation button 108. In addition, in a case where the transmission terminal 10 is the information processing terminal 40, the URI of the UI providing device 20 is obtained pressing a hard key or a soft key displayed on a touch panel of the information processing terminal 40 instead of the operation button 108.

The transmission and reception unit 21 of the UI providing device 20 receives the layout information requesting signal. In response to reception, the server unit 22 refers to the storage unit 2000 based on the specified URI and reads layout information "lot" (step S81).

Next, the server unit 22 transmits, via the transmission and reception unit 21, the read layout information "lot" to the transmission terminal that transmitted the layout information requesting signal (step S82). The layout information "lot" includes layout information about both the standard auxiliary field 173 and the auxiliary field 173 with simplified display.

The transmission and reception unit 11 of the transmission terminal 10 stores the layout information "lot" in a volatile memory (step S83). The volatile memory is the RAM 103, for example. In other words, because the layout information "lot" obtained once is stored in the transmission terminal 10, it is not necessary to obtain the layout information "lot" again from the UI providing device 20 while the transmission terminal 10 is powered ON. In accordance with this, even if the transmission terminal 10 disables the auxiliary field 173 once and displays the auxiliary field 173 again afterwards, the transmission terminal 10 can read the layout information "lot" from the volatile memory of the transmission terminal 10. Accordingly, it is possible to reduce a processing time to obtain the layout information "lot," so that a time to display the auxillary field 173 can also be reduced. Further, if the layout information "lot" is stored in the volatile memory, the layout information "lot" is deleted when the transmission terminal 10 is powered OFF. Accordingly, it is possible to prevent the layout information "lot" from leaking out of the transmission terminal 10.

Next, the auxiliary field displaying unit 18 of the transmission terminal 10 transmits a terminal information requesting signal to the transmission management device 50 (step S84). The terminal information requesting signal is a signal for requesting the number of transmission terminals 10 that are participating in the video conference.

The transmission and reception unit 51 of the transmission management device 50 receives the terminal information requesting signal. In response to reception, the terminal state obtaining unit 55 searches the terminal managing database DB 5003 and calculates the number of terminal IDs having the operation state "Online (transmitting)" (step S85). In other words, the terminal state obtaining unit 55 determines a terminal management table in which the IP address of the transmission terminal 10 that transmitted the terminal information requesting signal is registered and determines, from the terminal management table, all terminal IDs having the operation state "Online (transmitting)" to obtain the number of terminal IDs. In the embodiment, the terminal IDs detected by the terminal state obtaining unit 55 are "01aa," "01cb," and "01db," so that the number of terminal IDs is "3." In addition, the operation state of the transmission terminal 10*aa* having the terminal ID "01aa" is set to "Online (transmitting)" in step S43 of FIG. 8.

In addition to the number of transmission terminals 10 whose operation state is "Online (transmitting)," the number of the transmission terminals 10 whose operation state is "Online (transmission is possible)" may be obtained. In accordance with this, each transmission terminal 10 can display, on the display screen panel 120, the number of transmission terminals 10 that have logged in. Further, the number of transmission terminals 10 having the operation state "Online (transmitting)" and the number of transmission terminals 10 having the operation state "Online (transmission is possible)" may be separately obtained and each transmission terminal 10 may separately display the numbers on the display screen panel 120. In accordance with this, if both numbers do not match, it is possible to determine that there is a user that is not participating in the video conference.

Next, the terminal state obtaining unit 55 transmits, via the transmission and reception unit 51, the number of terminal IDs having the operation state "Online (transmitting)" obtained above to the transmission terminal 10 that transmitted the terminal information requesting signal (step S86).

In addition, the terminal state obtaining unit 55 may transmit the number of terminal IDs having the operation state "Online (transmitting)" to transmission terminals 10 that are online other than the transmission terminal 10 that transmitted the terminal information requesting signal. For example, when the number of terminal IDs having the operation state "Online (transmitting)" is transmitted to the transmission terminal 10*aa* having the terminal ID "01aa" in step S86, the number of terminal IDs is also transmitted to the transmission terminals 10*cb* and 10*db* having the terminal IDs "01cb" and "01db." In accordance with this, the transmission terminals 10*cb* and 10*db* having the terminal IDs "01cb" and "01db" can display the number of locations in the auxiliary field 173 by merely receiving the layout information "lot."

The transmission and reception unit 11 of the transmission terminal 10 receives the number of terminal IDs having the operation state "Online (transmitting)" and the auxiliary field displaying unit 18 displays the number of terminal IDs on the display screen panel 120 (step S87). In other words, the auxiliary field displaying unit 18 interprets the layout information "lot," determines the location of the standard auxiliary field 173 and the layout of the first field an to the sixth field ar6, sets information about transmission states in the first field an to the sixth field ar6, and displays the transmission states on the display screen panel 120.

The terminal ID of its own terminal in the first field ar1 is stored in the storage unit 1000. The number of locations in the second field ar2 is transmitted from the transmission management device 50. The conference time in the third field ar3 since a session is established is measured by the transmission terminal 10 after the session is established. Any type of information in the fourth field ar4 may be information stored in the transmission terminal 10 or the transmission management device 50, for example. The network band information in the fifth field ar5 is a communication speed with the relay device 30, the communication speed being measured and displayed periodically or in real time by the transmission terminal 10. The cursor button 1736 in the sixth field ar6 is image data such as an icon determined in advance.

In accordance with this, without transitioning to the information display mode, the transmission terminal 10 can display the number of locations that are participating in the video conference. Accordingly, the user does not need operate the operation button 108 or the like. Further, the transmission terminal remains in the full screen display mode, so that the user can determine the number of locations while viewing images of the locations. Further, even if the number of locations that are participating in the video conference exceeds the number of the upper limit of display, the user can correctly determine the number of locations.

<Procedure for Displaying Auxiliary Fields>

Figure 15:
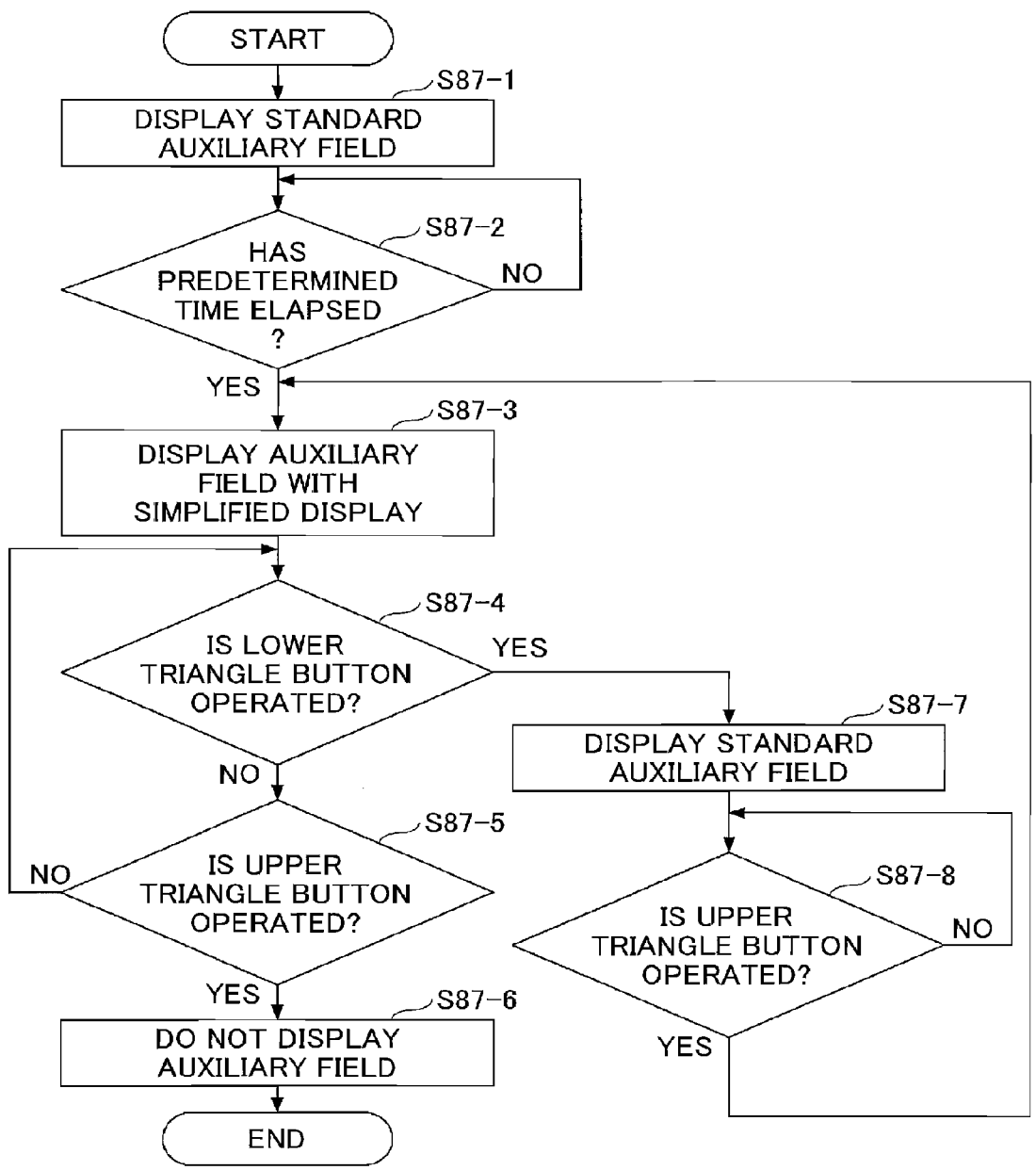
FIG. 15 is a flowchart depicting an operation procedure by which a transmission terminal switches between a standard auxiliary field and an auxiliary field with simplified display according to an embodiment of the present invention.

FIG. 15 is a flowchart depicting an operation procedure by which the transmission terminal 10 switches between the standard auxiliary field 173 and the auxiliary field 173 with simplified display according to the embodiment of the present invention. In addition, as described above, an operation of the cursor button 1736 (upper triangle button 1736*u* and lower triangle button 1736*d*) means an operation of the operation button 108.

The process in FIG. 15 starts when the auxiliary field displaying unit 18 displays the standard auxiliary field 173 in step S87 of FIG. 14 (step S87-1).

The auxiliary field displaying unit 18 determines, after the standard auxiliary field 173 is displayed, whether a predetermined time has elapsed (step S87-2) The predetermined time may be determined in advance or employ a time set by the user.

If the predetermined time has elapsed (Yes in step S87-2), the auxiliary field displaying unit 18 switches the standard auxiliary field 173 to the auxiliary field 173 with simplified display (step S87-3). Both the upper triangle button 1736*u* and the lower triangle button 1736*d* of the cursor button 1736 are black in the auxiliary field 173 with simplified display, so that it is possible to allow the user to notice that the screen changes when one of the triangle buttons is pressed.

The auxiliary field displaying unit 18 determines whether the lower triangle button 1736*d* is operated (step S87-4).

If the lower triangle button 1736*d* is operated (Yes in step S87-4), the auxiliary field displaying unit 18 switches the auxiliary field 173 with simplified display to the standard auxiliary field 173 (step S87-7). In the standard auxiliary field 173, it is possible to suggest that nothing will occur even if the lower triangle button 1736*d* is pressed because the lower triangle button 1736*d* is outlined and that the auxiliary field 173 with simplified display will be displayed if the upper triangle button 1736*u* is pressed because the upper triangle button 1736*u* is black. Further, the standard auxiliary field 173 is displayed translucently, so that the video conference can be continuously held without reducing visibility of image data as much as possible.

If the lower triangle button 1736*d* is not operated (No in step S87-4), the auxiliary field displaying unit 18 determines whether the upper triangle button 1736*u* is operated (step S87-5). In addition, either of whether the lower triangle button 1736*d* is operated or whether the upper triangle button 1736*u* is operated may be determined first.

If the upper triangle button 1736*u* is operated (Yes in step S87-5), the auxiliary field displaying unit 18 disables the display of the auxiliary field (step S87-6). In other words, neither the standard auxiliary field 173 nor the auxiliary field 173 with simplified display is displayed. Thereafter, the auxiliary field 173 with simplified display may be displayed in response to an operation of the lower triangle button 1736*d* (namely, the process returns to step S87-3). In addition, the upper triangle button 1736*u* may be designed to occur nothing even if it is operated or may display the standard auxiliary field 173 in response to an operation. Control to return to step S87-3 may be possible such that only the cursor button 1736 is displayed while the display of both the standard auxiliary field 173 and the auxiliary field 173 with simplified display is disabled.

If the standard auxiliary field 173 is displayed in step S87-7, the auxiliary field displaying unit 18 determines whether the upper triangle button 1736*u* is operated (step S87-8).

If the upper triangle button 1736*u* is operated (Yes in step S87-8), the auxiliary field displaying unit 18 switches the standard auxiliary field 173 to the auxiliary field 173 with simplified display (step S87-3).

In this manner, the user can switch the display form of the auxiliary field 173 by operating the cursor button 1736.

<Operation Procedure after Auxiliary Field is Displayed>

In the following, operations of the transmission management device 50 and the transmission terminal 10 after the auxiliary field 173 is displayed by the transmission terminal 10 in step 987 of FIG. 14 is described.

Figure 16:
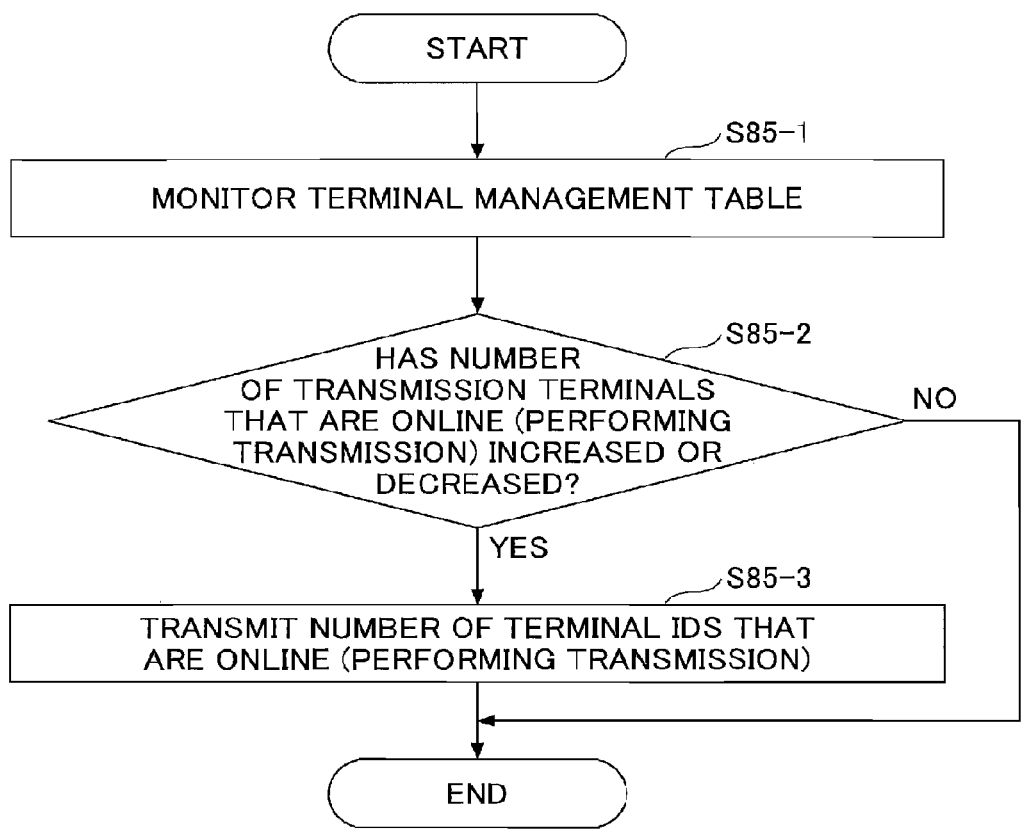
FIG. 16 is a flowchart depicting an operation procedure by which a transmission management device monitors the number of terminal IDs that are online according to an embodiment of the present invention.

FIG. 16 is a flowchart depicting an operation procedure of the transmission management device 50 according to the embodiment of the present invention. The process in FIG. 16 is repeatedly performed since the transmission management device 50 calculates the number of terminal IDs that are online in step S85 of FIG. 14, for example.

The terminal state obtaining unit 55 monitors the terminal management table in which the IP address (or the terminal ID) of the transmission terminal 10 that transmitted the terminal information requesting signal is registered (step 985-1).

The terminal state obtaining unit. 55 determines whether the number of terminal IDs having the operation state "Online (transmitting)" calculated in step S85 of FIG. 14 is increased or decreased (step S85-2).

If a result of the determination in step S85-2 is No, the process in FIG. 16 ends and the process is repeatedly performed from step S85-1.

If the result of the determination in step S85-2 is Yes, the number of locations is changed. Accordingly, the terminal state obtaining unit 55 transmits the number of current terminal IDs whose operation state is "Online (transmitting)" to the transmission terminal 10 (step S85-3). In accordance with this, the transmission terminal 10 that once obtains the number of terminal IDs having the operation state "Online (transmitting)" can continuously obtain a correct number of locations.

In addition, in FIG. 16, the terminal state obtaining unit 55 may transmit the number of terminal IDs having the operation state "Online (transmitting)" to transmission terminals 10 that are online other than the transmission terminal 10 that transmitted the terminal information requesting signal. In accordance with this, all the transmission terminals 10 that are online can continuously maintain the correct number of locations.

<<Another Example of Switching Between Standard Auxiliary Field and Auxiliary Field with Simplified Display>>

Figure 17:
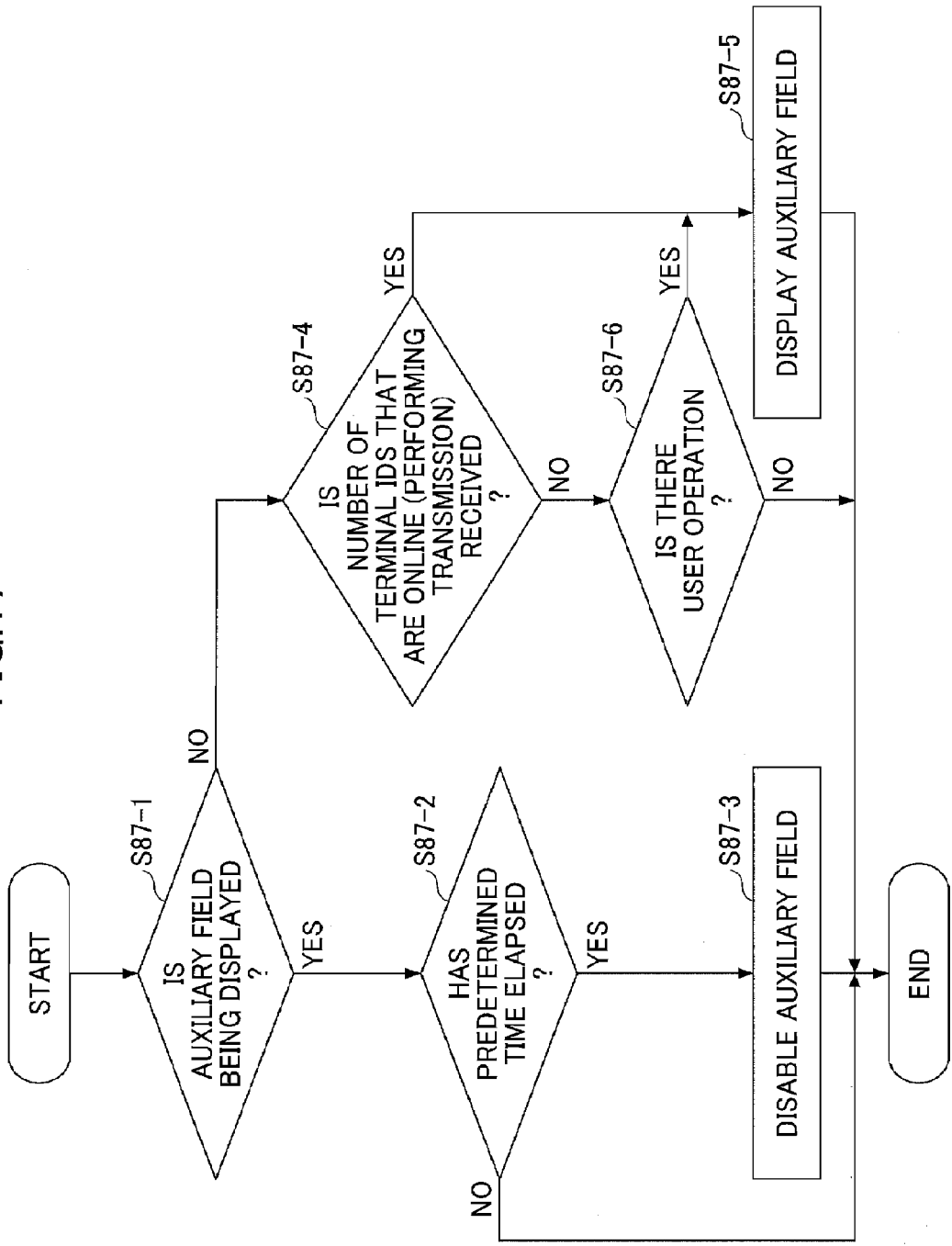
FIG. 17 is a flowchart depicting an operation procedure by which a transmission terminal switches between a standard auxiliary field and an auxiliary field with simplified display according to an embodiment of the present invention.

FIG. 17 is a flowchart depicting an operation procedure by which the transmission terminal 10 switches between the standard auxiliary field 173 and the auxiliary field 173 with simplified display according to the embodiment of the present invention. The process in FIG. 17 is repeatedly performed after the transmission terminal 10 displays the auxiliary field 173 in step S87 of FIG. 14, for example.

First, the auxiliary field displaying unit 18 determines whether the auxiliary field 173 is being displayed (step S87-1).

If a result of the determination in step S87-1 is Yes, the auxiliary field displaying unit 18 determines whether a time that has elapsed since the start of the display of the auxiliary field 173 exceeds a predetermined time (step S87-2). The predetermined time is several seconds to several tens of seconds, for example, but the user may set the predetermined time.

If a result of the determination in step S87-2 is Yes, the auxiliary field displaying unit 18 disables the auxiliary field 173 (step S87-3). In accordance with this, the user can participate in the video conference while focusing mainly on images of locations.

If the result of the determination in step S87-2 is No, the auxiliary field displaying unit 18 continuously displays the auxiliary field 173.

If the result of the determination in step S87-1 is No, the auxiliary field displaying unit 18 determines whether there is an event to display the auxiliary field 173. Examples of the event include a case where the number of terminal IDs having the operation state "Online (transmitting)" is received from the transmission management device 50 and a case where the user performs an operation for display.

First, the auxiliary field displaying unit 18 determines whether the number of terminal IDs having the operation state "Online (transmitting)" is received from the transmission management device 50 (step S87-4).

If a result of the determination in step S87-4 is Yes, the auxiliary field displaying unit 18 displays the auxiliary field 173 again based on the layout information "lot" stored in the RAM 103 (step S87-5). In accordance with this, if the number of locations is changed, the transmission terminal 10 can immediately display the changed number of locations in the auxiliary field 173.

If the result of the determination in step S87-4 is No, the auxiliary field displaying unit 18 determines whether the user performs an operation for display (step S87-6).

If a result of the determination in step S87-6 is Yes, the auxiliary field displaying unit 18 displays the auxiliary field 173 again based on the layout information "lot" stored in the RAM 103 (step S87-5). In accordance with this, the user can display the auxiliary field 173 at a given time.

If the results of the determination in steps S87-4 and 087-6 are No, the auxiliary field displaying unit 18 continuously disables the auxiliary field 173 without display.

Accordingly, when the number of locations is displayed in response to a change, the user is likely to notice that the number of locations is changed. Further, the auxiliary field 173 is disabled after the predetermined time has elapsed, so the user can participate in the video conference while focusing on images of locations.

If the user wishes to confirm a change of the number of locations or wishes to know the details of information about locations that are participating in the video conference by confirming the number of locations, the user may switch to the information display mode. The user can switch to the information display mode if the number of locations is changed. Accordingly, it is not necessary to switch to the information display mode in order to confirm the number of locations or locations that are participating in the video conference.

<Procedure for Displaying Auxiliary Field in Information Display Mode>

In the embodiment, the transmission terminal 10 does not display the auxiliary field 173 in the information display mode. In accordance with this, in the information display mode, the user does not perform an operation to display the auxiliary field 173. Accordingly, in the information display mode, the operation button 108 may have only a scroll function.

Figure 18:
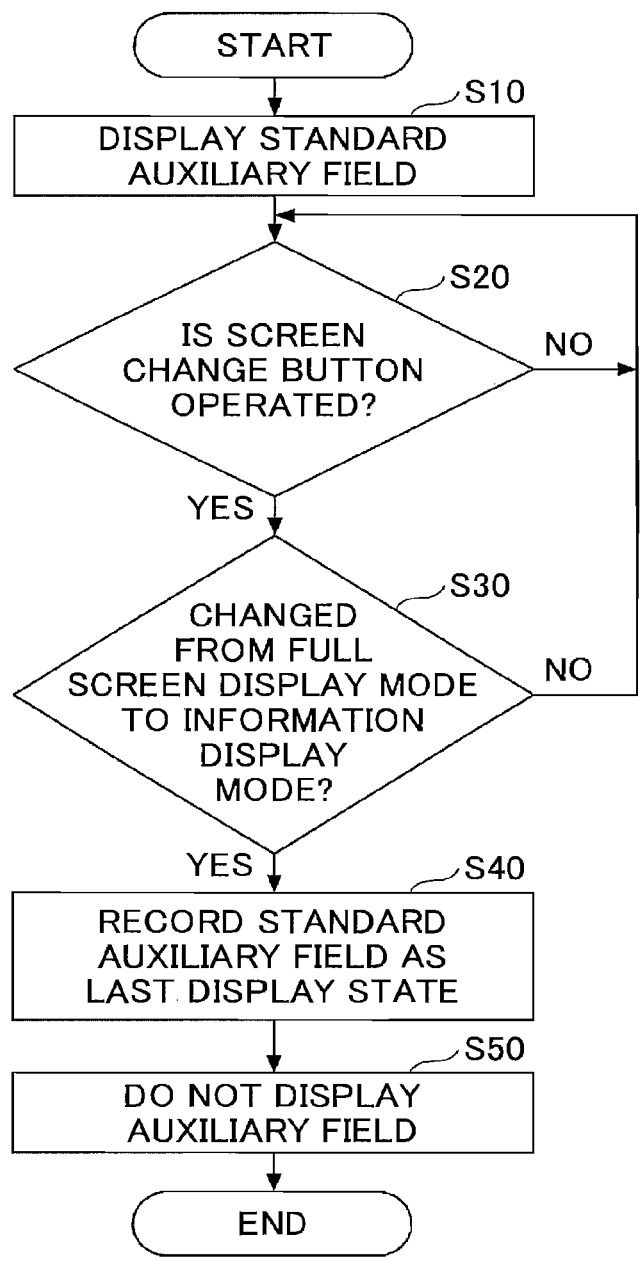
FIG. 18 is a flowchart depicting a procedure by which a transmission terminal disables an auxiliary field in an information display mode according to an embodiment of the present invention.

FIG. 18 is a flowchart depicting a procedure by which the transmission terminal 10 disables the auxiliary field 173 in the information display mode according to the embodiment of the present invention. First, it is assumed that the standard auxiliary field 173 is displayed as depicted in FIG. 15 or FIG. 17 (step S10).

Next, the display controlling unit 17 determines whether the operation input receiving unit 12 receives an operation of a screen change button (step S20). The screen change button is a button for the user to switch layouts. The screen change button may be an operation button 108 different from the operation button 108 for operating the cursor button 1736, For example, if a button corresponding to the cursor button 1736 is an operation button 108*b*, the screen change button is an operation button 108*c*, for example. Further, the screen change button may be a soft key of a touch panel. In addition, in a case where the transmission terminal 10 is the information processing terminal 40, a hard key or a soft key displayed on the touch panel of the information processing terminal 40 is pressed as the screen change button.

With the screen change button, the user can alternately switch the information display mode to the full screen display mode or switch the full screen display mode to the information display mode. Further, the number of layouts of the full screen display mode may not be one. For example, the layout for displaying image data transmitted from a plurality of locations includes a layout for equally dividing the image data and a layout for enlarging the display of image data from a location with speech. In addition, there are a layout for superposing a small image data of its own location on the image data of the location with speech and a layout for displaying conference materials. Each time the screen change button is operated, the display controlling unit 17 switches these layouts in turn and performs display on the display screen panel 120. Accordingly, each time the screen change button is operated, the display screen panel 120 transits to the information display mode, to the full screen display mode (layout 1), to the full screen display mode (layout 2), to the full screen display mode (layout 3) . . . , and to the information display mode, for example.

Accordingly, the display controlling unit 17 determines whether the full screen display mode is switched to the information display mode (step S30). Because transition order of layouts in the full screen display mode and a transition timing from the full screen display mode to the information display mode are determined, the display controlling unit 17 can determine whether the full screen display mode is switched to the information display mode in accordance with the transition order determined in advance.

If results of the determination in steps S20 and S30 are No, namely, in the full screen display mode, the standard auxiliary field 173 is continuously displayed.

If the results of the determination in steps S20 and S30 are Yes, the auxiliary field displaying unit 18 causes the storage unit 1000 to store the standard auxiliary field 173 as the last display state 1000*b* (step S40). In accordance with this, when returning from the full screen display mode to the information display mode, the auxiliary field displaying unit 18 can display the standard auxiliary field 173.

Then the auxiliary field displaying unit 18 ends the display of the auxiliary field 173 (step S50). In other words, the auxiliary field 173 ceases to be displayed in the information display mode. This is also described such that the auxiliary field 173 is disabled in a process of transition from the full screen to the information display screen.

In FIG. 18, the case where the standard auxiliary field 173 is displayed is described. However, the same procedure may apply to a case where the auxiliary field 173 with simplified display is displayed. Accordingly, in the information display mode, the auxiliary field 173 with simplified display also ceases to be displayed.

Further, it neither the standard auxiliary field 173 nor the standard auxiliary field 173 is displayed in FIG. 18, the auxiliary field displaying unit 18 records the fact that the auxiliary field 173 is not displayed as the last display state 1000*b*.

<<Procedure for Display in Transition from Information Display Mode to Full Screen Display Mode>>

Figure 19:
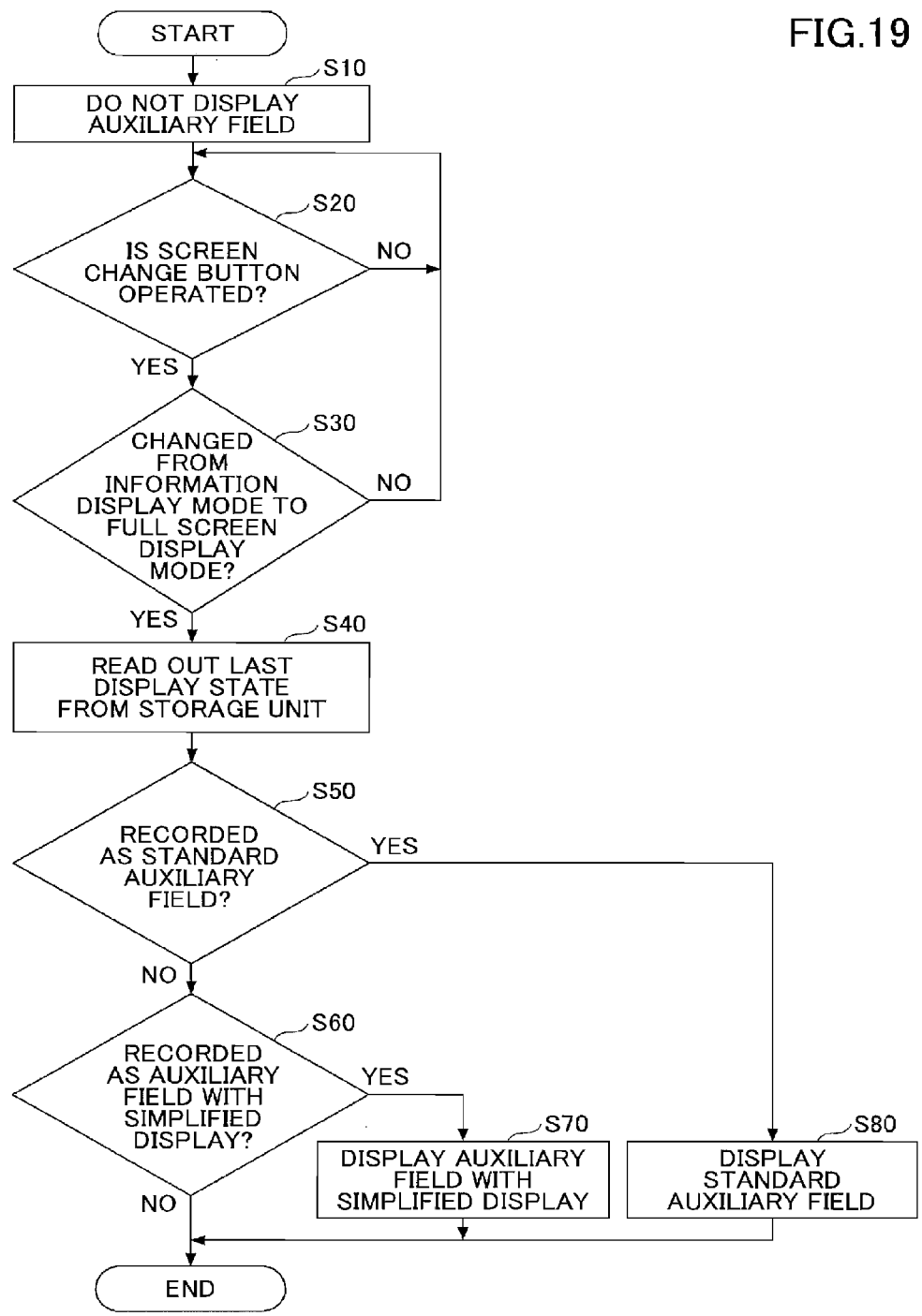
FIG. 19 is a flowchart depicting a procedure by which a transmission terminal displays an auxiliary field in a full screen display mode according to an embodiment of the present invention.

In the following, a procedure for transition from the information display mode to the full screen display mode is described with reference to FIG. 19, FIG. 19 is a flowchart depicting a procedure by which the transmission terminal 10 displays the auxiliary field 173 in the full screen display mode according to the embodiment of the present invention. First, the auxiliary field 173 is not displayed in step S50 of FIG. 18 (step S10).

Next, the display controlling unit 17 determines whether the operation input receiving unit 12 receives an operation of the screen change button (step S20).

If a result of the determination in step S20 is Yes, the display controlling unit 17 determines whether to transit from the information display mode to the full screen display mode (step S30). It there is only one layout of the information display mode, when the screen change button is operated in the information display mode, the information display mode always transits to the full screen display mode. However, if there are two or more layouts of the information display mode, destination in step S30 is necessary.

If a result of the determination in step S30 is Yes, the auxiliary field displaying unit 18 reads the last display state 1000*b* stored in the storage unit 1000 (step S40).

Next, the auxiliary field displaying unit 18 determines whether the last display state 1000*b* is the standard auxiliary field 173 (step S50).

If a result of the determination in step S50 is Yes, the auxiliary field displaying unit 18 displays the standard auxiliary field 173 (step S80). Accordingly, the standard auxiliary field 173 is displayed in the full screen display mode.

If the result of the determination in step S50 is No, the auxiliary field displaying unit 18 determines whether the last display state 1000*b* is the auxiliary field 173 with simplified display (step S60).

If a result of the determination in step S60 is Yes, the auxiliary field displaying unit 18 displays the auxiliary field 173 with simplified display (step S70). Accordingly, the auxiliary field 173 with simplified display is displayed in the full screen display mode.

If the result of the determination in step S60 is No, because the fact that the auxiliary field 173 is not displayed in the full screen display mode is recorded in the last display state 1000*b*, the auxiliary field displaying unit 18 does not display the auxiliary field 173.

Accordingly, upon transitioning from the information display mode to the full screen display mode, it is possible to return to the display state of the auxiliary field 173 obtained before transition from the full screen display mode to the information display mode.

<Automatic Transition from Standard Auxiliary Field to Auxiliary Field with Simplified Display>

As described above with reference to FIG. 15, the auxiliary field displaying unit 18 automatically displays the auxiliary field 173 with simplified display when a predetermined time has elapsed after the video conference starts even if the user does not perform an operation. In some cases, it is preferable to display the standard auxiliary field 173 or the auxiliary field 173 with simplified display depending on whether a predetermined time has elapsed after the video conference starts.

Figure 20:
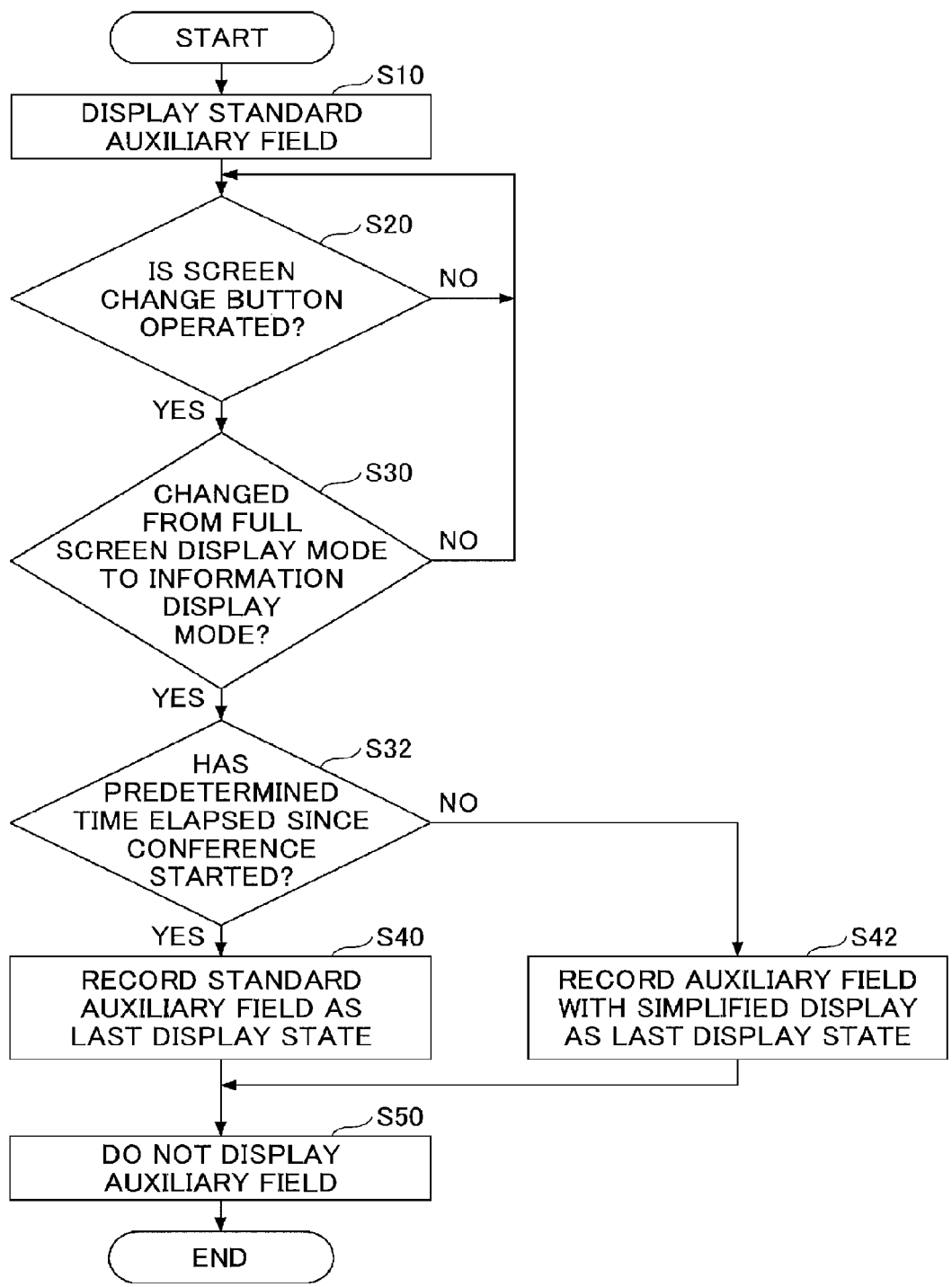
FIG. 20 is a flowchart depicting a procedure by which a transmission terminal disables an auxiliary field in an information display mode according to an embodiment of the present invention.

FIG. 20 is a flowchart depicting a procedure by which a transmission terminal disables an auxiliary field in an information display mode according to an embodiment of the present invention. The description of FIG. 20 mainly deals with a difference from FIG. 18. Processes in steps S10 to S30 are the same as in FIG. 18.

If the destination in step S30 is Yes, the auxiliary field displaying unit 18 determines whether a predetermined time has elapsed after the video conference starts (step S32). The predetermined time since the video conference starts is the conference time in the third field ar3. Accordingly, upon transition from the full screen display mode to the information display mode, whether the predetermined time has elapsed is determined.

If the predetermined time has elapsed (Yes in step S32), the auxiliary field displaying unit 18 records the standard auxiliary field 173 as the last display state 1000*b* (step S40). Because the standard auxiliary field 173 is being displayed while the predetermined time has elapsed, it is possible to consider that the user allows the display of the standard auxiliary field 173. Accordingly, upon transition from the information display mode to the full screen display mode, the auxiliary field displaying unit 18 can display the standard auxiliary field 173.

If the predetermined time has not elapsed (No in step S32), the auxiliary field displaying unit 18 records the auxiliary field 173 with simplified display as the last display state 1000*b* (step S42). Although the transition from the full screen display mode to the information display mode is performed while the predetermined time has not elapsed, upon next transition from the information display mode to the full screen display mode, the auxiliary field 173 with simplified display will be displayed regardless of the elapse of the predetermined time. In other words, it is determined that the predetermined time elapses in the transition from the full screen display mode to the information display mode. In accordance with this, upon transition from the information display mode to the full screen display mode, it is possible to display image data using the display screen panel 120 widely in the same manner as in the case where the predetermined time has elapsed after the video conference starts.

The auxiliary field displaying unit 18 ends the display of the auxiliary field 173 (step S50).

As described above, because the transmission terminal 10 or an information processing method performed by the transmission terminal 10 in the embodiment does not display the auxiliary field 173 in the information display mode, the information display mode and the auxiliary field 173 are mutually exclusive. In accordance with this, it is possible to operate the information display mode with a single operation button 108 (any one of operation buttons 108*a* to 108*e*). In other words, if the user wishes to perform a scroll operation in the information display mode, the user can perform the scroll operation by operating the operation button 108.

Further, the sequential number 614 in the information display screen may provide the user with the same information as the number of locations in the auxiliary field 173. However, because the auxiliary field 173 is not displayed in the information display mode, it is possible to prevent the same information from being redundantly displayed.

<Process when Operation Button 108 is Operated>

Figure 21:
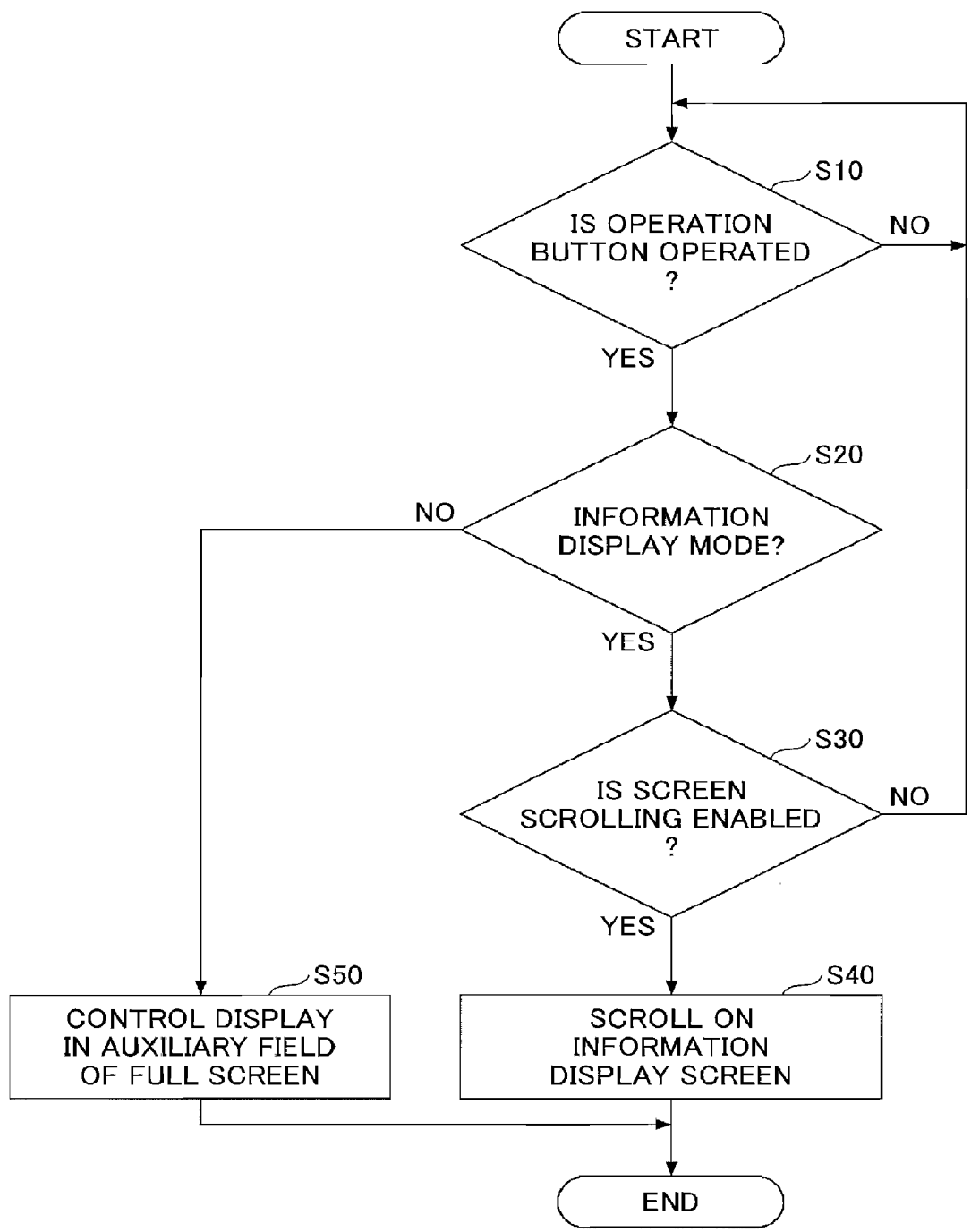
FIG. 21 is a flowchart depicting a process performed by a display controlling unit when a cursor button is operated according to an embodiment of the present invention.
Figure 22:
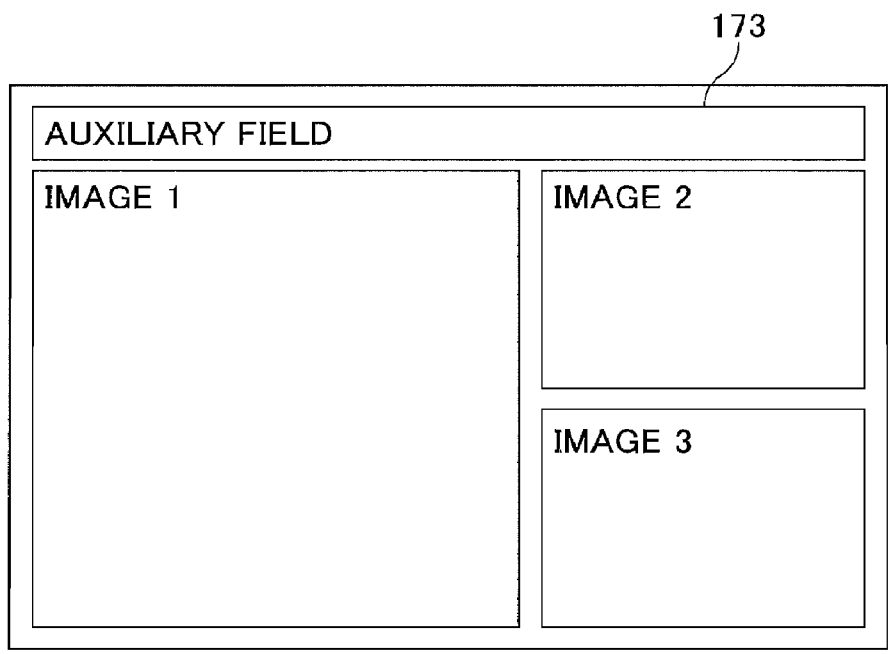
FIG. 22 is a diagram depicting an auxiliary field displayed in a full screen display mode according to an embodiment of the present invention.

FIG. 21 is a flowchart depicting a process performed by the display controlling unit 17 when the operation button 108 is operated according to the embodiment of the present invention. The process in FIG. 21 may start in either the information display mode or the full screen display mode.

The display controlling unit 17 determines whether the operation button 108 is pressed (step S10).

If a result of the determination in step S10 is Yes, the display controlling unit 17 determines whether the information display mode is displayed (step S20).

If a result of the determination in step S20 is No, because of the full screen display mode, the auxiliary field displaying unit 18 performs display control on the auxiliary field 173 in the full screen (step S50). If the standard auxiliary field 173 is already being displayed, the auxiliary field displaying unit 18 displays the auxiliary field 173 with simplified display. If the auxiliary field 173 with simplified display is already being displayed, the auxiliary field displaying unit 18 disables the auxiliary field 173 or displays the standard auxiliary field 173 depending on a direction in which the operation button 108 is operated. If the auxiliary field 173 is not being displayed, the auxiliary field displaying unit 18 displays the standard auxiliary field 173.

If the result of the determination in step S20 is Yes, the display controlling unit 17 determines whether screen scrolling is enabled (step S30). Whether the screen scrolling is enabled is determined based on the number of locations, for example, in order to display a scroll bar for scrolling on the screen in the information display mode, the number of locations must be a certain number or more. In other words, if the number of locations is a threshold or more, the screen scrolling is enabled. The determination may be based on the number of lines in the information display mode instead of the number of locations. This is effective if the number of lines assigned to one location is different.

If a result of determination in step S30 is No, the process returns to step S10 and the display controlling unit 17 performs nothing.

If the result of the determination in step S30 is Yes, the display controlling unit 17 scrolls the information display screen (step S40). In other words, because the auxiliary field 173 is not displayed in the information display mode, it is possible to scroll the information display screen upward or downward depending on an operation of the operation button 108.

Accordingly, although two functions are assigned to a single operation button 108 (any one of operation buttons 108a to 108e), the user can perform a desired operation. In other words, in the full screen display mode, it is possible to control switching between display and non-display of the auxiliary field 173 and its display form (standard or simplified display) in accordance with an operation of the operation button 108. In the information display mode, it is possible to scroll the information display screen in accordance with an operation of the operation button 108 (if the number of locations is a threshold or more).

<<Other Applications>>

Although the best mode to implement the present invention is described with reference to examples, the present invention is not limited at all to such examples. It is possible to add various types of modifications and replacements to the present invention without departing from the scope of the present invention.

For example, the relay device 30, the transmission management device 50, and the program providing device 90 may not be independently present but may be constructed with a single computer. Further, the units and the storage units 1000, 2000, and 5000 included in the transmission terminal 10, the transmission management device 50, and the program providing device 90 may be assigned to a plurality of computers. In this case, the UI providing device 20 may be included as a function of any one of the computers.

Further, in the above embodiment, the video conference system is described as an example of the transmission system 1. However, the transmission system 1 is not limited to this but may include a phone system such as Internet Protocol (IP) phone or Internet phone.

Further, the transmission system 1 may be a system including a car navigation device installed in a mobile body. Further, a PC for sharing a screen may be connected to the transmission terminal 10.

Further, in the embodiment, although image data and voice sound data are described as an example of content data, the content data is not limited to these types of data. The content data may be touch data. In this case, a sense of touch by the user on one transmission terminal 10 is transmitted to another transmission terminal 10.

Further, the content data may be smell data. In this case, scent (smell) on one transmission terminal 10 is transmitted to another transmission terminal 10. Further, the content data may be at least one of the image data, the voice sound data, the touch data, and the smell data.

Further, in the embodiment, the video conference is held in the transmission system 1. However, the present invention is not limited to this. The transmission system 1 may be used for a meeting, a general conversation between family members or friends, or presentation of information in one direction.

The transmission terminal 10 and the information processing terminal 40 are examples of an information processing apparatus in the claims. The full screen is an example of a first screen. The information display screen is an example of a second screen. The display controlling unit 17 and the auxiliary field displaying unit 18 are examples of a display controlling unit. The operation button 108c is an example of a first instruction receiving unit. The operation button 108b is an example of a second instruction receiving unit. Steps S20 and S30 in FIGS. 18 and 20 are examples of a switching instruction. The standard auxiliary field 173 is an example of auxiliary information in a first display form. The auxiliary field 173 with simplified display is an example of the auxiliary information in a second display form. Information displayed in the auxiliary field 173 is an example of auxiliary information.

According to an embodiment of the present invention, it is possible to provide an information processing apparatus capable of obtaining a preferable screen transition.

Further, the present invention is not limited to these embodiments, and various variations and modifications may be made without departing from the scope of the present invention.

What is claimed is:

1. An information processing apparatus for communication with an information processing device via a network, the information processing apparatus comprising:
   processing circuitry configured to perform display control on a first screen that displays image data transmitted from the information processing device or on a second screen that displays information about the information processing device;
   a first instruction receiving input element configured to receive a switching instruction to switch the first screen to the second screen; and
   a memory configured to store a display form of the auxiliary information in a case where the switching instruction is received,
   wherein the processing circuitry performs the display control in the case where the first instruction receiving input element receives the switching instruction, such that auxiliary information about communication with the information processing device, the auxiliary information being displayed on the first screen, is not displayed on the second screen,
   wherein in the case where the first instruction receiving input element receives an instruction to switch the second screen to the first screen, the processing circuitry performs the display control such that the auxiliary information is displayed in the display form read from the memory, wherein when a predetermined time has elapsed since a start of communication with the information processing device, the processing circuitry performs the display control such that the auxiliary information is displayed in the display form changed from a first display form to a second display form and the memory stores the first display form in the case where the switching instruction is received after the predetermined time has elapsed, and wherein in the case where the first instruction receiving input element receives the instruction to switch the second screen to the first screen, the processing circuitry performs the display control such that the auxiliary information is displayed in the first display form read from the memory.

2. The information processing apparatus according to claim 1, wherein in the case where the first instruction receiving input element receives an instruction to switch the second screen to the first screen, the processing circuitry performs the display control such that the auxiliary information is displayed on the first screen.

3. The information processing apparatus according to claim 2, a second instruction receiving input element configured to receive an instruction to change display or non-display of the auxiliary information and a display form of the auxiliary information, in which another instruction other than the instruction to change is assigned to the second instruction receiving input element, wherein the second instruction receiving input element determines, upon receiving an instruction, whether to receive the instruction to change or the other instruction depending on whether the processing circuitry controls display of the first screen or the second screen.

4. The information processing apparatus according to claim 3, wherein upon receiving the instruction, the second instruction receiving input element receives an instruction to scroll information about the information processing device in the case where the processing circuitry controls display of the second screen.

5. The information processing apparatus according to claim 1, wherein the memory stores the second display form in the case where the first instruction receiving input element receives the switching instruction when the predate the case where the first instruction receiving input element receives the instruction to switch the second screen to the first screen, the processing circuitry performs the display control such that the auxiliary information is displayed in the second display form read from the memory.

6. A non-transitory recording medium storing a computer-readable program that, when executed by an information processing apparatus for communication with an information processing device via a network, causes the information processing apparatus to perform a method comprising:

performing display control on a first screen that displays image data transmitted from the information processing device or on a second screen that displays information about the information processing device; and receiving a switching instruction to switch the first screen to the second screen, storing, at a memory, a display form of the auxiliary information in a case where the switching instruction is received, wherein the display control is performed in the case where the switching instruction is received, such that auxiliary information about communication with the information processing device, the auxiliary information being displayed on the first screen, is not displayed on the second screen, wherein in the case where an instruction to switch the second screen to the first screen is received, the method includes performing the display control such that the auxiliary information is displayed in the display form read from the memory, wherein when a predetermined time has elapsed since a start of communication with the information processing device, the method includes performing the display control such that the auxiliary information is displayed in the display form changed from a first display form to a second display form and the memory stores the first display form in the case where the switching instruction is received after the predetermined time has elapsed, and wherein in the case where the instruction to switch the second screen to the first screen is received, the method includes performing the display control such that the auxiliary information is displayed in the first display form read from the memory.

7. An information processing method performed by an information processing apparatus for communication with an information processing device via a network, the information processing method comprising:

performing display control on a first screen that displays image data transmitted from the information processing device or on a second screen that displays information about the information processing device; and receiving a switching instruction to switch the first screen to the second screen, storing, at a memory, a display form of the auxiliary information in a case where the switching instruction is received, wherein the display control is performed in the case where the switching instruction is received, such that auxiliary information about communication with the information processing device, the auxiliary information being displayed on the first screen, is not displayed on the second screen, wherein in the case where an instruction to switch the second screen to the first screen is received, the method includes performing the display control such that the auxiliary information is displayed in the display form read from the memory, wherein when a predetermined time has elapsed since a start of communication with the information processing device, the method includes performing the display control such that the auxiliary information is displayed in the display form changed from a first display form to a second display form and the memory stores the first display form in the case where the switching instruction is received after the predetermined time has elapsed, and wherein in the case where the instruction to switch the second screen to the first screen is received, the method includes performing the display control such that the auxiliary information is displayed in the first display form read from the memory.

* * * * *